(12) United States Patent
La Porta et al.

(10) Patent No.: US 7,120,453 B2
(45) Date of Patent: Oct. 10, 2006

(54) PAGING OF MOBILE HOSTS ON AN INTERNET PROTOCOL NETWORK

(75) Inventors: Thomas F. La Porta, Holmdel, NJ (US); Li Li, Ithaca, NY (US); Ramachandran Ramjee, Matawan, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 948 days.

(21) Appl. No.: 09/837,809

(22) Filed: Apr. 18, 2001

(65) Prior Publication Data

US 2002/0046287 A1 Apr. 18, 2002

Related U.S. Application Data

(60) Provisional application No. 60/198,050, filed on Apr. 18, 2000.

(51) Int. Cl.
*H04Q 7/20* (2006.01)

(52) U.S. Cl. ............... 455/458; 455/422.1; 455/432.1; 455/456.1

(58) Field of Classification Search ............. 455/422.1, 455/432.1, 433, 435.1, 456.1–456.6, 458; 340/7.1, 7.2, 7.21, 7.22, 7.23, 7.28
See application file for complete search history.

(56) References Cited

U.S. PATENT DOCUMENTS 5,307,400 A * 4/1994 Sawyer et al. ........... 455/456.1
5,361,396 A * 11/1994 Onoe et al. ............... 455/435.1
6,292,667 B1 * 9/2001 Wallentin et al. ........... 455/458
6,330,454 B1 * 12/2001 Verdonk .................. 455/456.2
6,438,383 B1 * 8/2002 Hall et al. .................. 455/458
6,480,476 B1 * 11/2002 Willars ....................... 370/311
6,647,264 B1 * 11/2003 Sasamoto ................... 455/445
6,751,463 B1 * 6/2004 Lorello et al. ............... 455/466
6,842,462 B1 * 1/2005 Ramjee et al. ............. 370/466
2001/0036834 A1 * 11/2001 Das et al. ................... 455/458

OTHER PUBLICATIONS

A. Valko, Cellular IP, IETF Internet Draft, Nov. 1998.
T.Y.C. Woo, et al., Update and Search Algorithms for Wireless Two-Way Messaging, Infocom '98.
T.Y.C. Woo, et al., Update and Search Algorithms for Wireless Two-Way Messaging, Infocom '98, no month listed.

* cited by examiner

*Primary Examiner*—Temica Beamer

(57) ABSTRACT

Base stations on an Internet protocol (IP) network define a number of paging areas. An IP mobile host assumes one of (i) an active state, wherein the host informs other network nodes of a change in its point of attachment from one base station to another, and (ii) a standby state wherein the host informs other nodes only when a new point of attachment is a base station of a different paging area from a last point of attachment, thus conserving power at the mobile host. When data on the network is addressed to a standby mobile host, a page request is directed to a base station(s) in the host's current paging area for transmission. The host enters the active state and transmits a page response which is received by a base station in the current paging area, and network routing information for the host is updated accordingly.

23 Claims, 20 Drawing Sheets

FIG. 6

TABLE I
PAGING PROCESSING TIMES IN MILLISECONDS

| Router initiated (HA) | Fixed (found) | Fixed (not) | Last-loc. (found) | Last-loc. (not) | Hier. (found) | Hier. (not) |
|---|---|---|---|---|---|---|
| init_page_request (router) | 0.173 | 0.173 | 0.323 | 0.316 | 0.196 | 0.203 |
| retry_page_request (router) | – | – | – | 0.157 | – | 0.155 |
| recv_init_page_request (bs) | 0.080 | 0.080 | 0.082 | 0.068 | 0.079 | 0.066 |
| recv_page_response (bs) | 0.378 | 0.378 | 0.331 | 0.317 | 0.334 | 0.316 |
| recv_page_response (router) | 0.279 | 0.279 | 0.190 | 0.193 | 0.204 | 0.215 |
| Base station initiated (FA) | | | | | | |
| init_page_request (bs) | 0.197 | 0.199 | 0.183 | 0.189 | 0.197 | 0.213 |
| retry_page_request (bs) | – | – | – | 0.117 | – | 0.118 |
| recv_init_page_request (bs) | 0.106 | 0.113 | – | 0.114 | 0.106 | 0.114 |
| recv_page_response (bs) | 0.237 | 0.233 | 0.251 | 0.234 | 0.249 | 0.232 |
| recv_page_response (router) | – | 0.429 | – | 0.413 | – | 0.428 |

FIG. 11

ROUTER PROCESSING FOR A GIVEN MOBILE HOST

| Routing entry | Paging entry | Host state | Router action |
|---|---|---|---|
| Y | Y/N | Active | Regular IP forwarding |
| N | Y | Standby | Paging processing |
| N | N | Null | Drop if no default route |

FIG. 12

```
1. Receive protocol message from neighbor with
      (MH IP ADDRESS, MGA) on Port A
2. If I am the Domain Root Router
3.    Set entry to (MH IP ADDRESS → MGA, Port A)
4. else
5.    Set entry to (MH IP ADDRESS → MGA, Port A)
6.    Forward to upstream neighbor along default route
7. endif
```

Paging update processing in base station/router

FIG. 13

1. IP packet for MH arrives at node with
     entry (MH IP address → MGA, Port A)
2. if (packet arrives from default route port
     or I am Domaine root Router)
3.   if ((no refresh on Port A) /* Failure */
4.      or (page queue < $\beta$)/*lightly loaded?*/
5.      or (I am a base station)) /* Initiate Paging */
6.          buffer packet and send page to MGA
7.          increase retry counter and set retry timer
8.   else    /* Push paging initiation downstream */
9.          route the packet through Port A
10.  endif
11. else
12.  forward packet along default route to DRR
13. endif Paging initiation in base station/router

FIG. 14

1. Receive protocol message with from neighbor
     (MH IP ADDRESS, MGA) on Port A
2. If I am the paging initiator
3. Set entry to (MH IP ADDRESS → Port A)
4. Forward buffered packets
5. else
6. Set entry to (MH IP ADDRESS → Port A)
7. Forward response hop-by-hop towards initiator
8. endif

PAGING OF MOBILE HOSTS ON AN INTERNET PROTOCOL NETWORK

CROSS REFERENCE TO RELATED APPLICATION

This application claims the priority under 35 U.S.C. § 119(e) of U.S. Provisional Application 60/198,050 filed Apr. 18, 2000, and entitled "IP Paging Service for Mobile Hosts".

BACKGROUND OF THE INVENTION

1. Field of the Invention

This invention relates to a scheme for delivering confirmation packets to mobile hosts affiliated with an Internet protocol (IP) network.

2. Discussion of the Known Art

In networks that support mobility, the precise location of a mobile host must be known before data addressed to the host can be delivered. There is a tradeoff between how closely the network tracts the host's current location, and the processing time required to locate the host when its current position is not precisely known beforehand.

Tracking the location of the mobile host involves procedures in which the host informs the network of its location at times triggered by movement, timer expiration, and the like. Specific protocols for tracking an IP mobile host are given in Request for Comment (RFC) 2002 of the Internet Engineering Task Force (IETF), all relevant portions of which are incorporated herein by reference.

Efforts are now underway to integrate both indoor (LAN) and outdoor (WAN) wireless access technologies over a common IP based access network. Such would allow more flexibility in deploying equipment which may greatly reduce network operation costs. In addition, an IP based access network should be able to support both voice and data services on a common infrastructure, resulting in seamless support of services across both wired and wireless networks. Such IP based networks are expected to be a basis for future third and fourth generation wireless networks.

It is known that the location of a mobile host can be determined using procedures such as paging that trigger a response from the mobile host. Paging typically involves transmitting a request for a given host to a number of potential locations of the host. This set of locations is defined as a paging area, and the area corresponds to an overall scope of coverage of a set of neighboring base stations.

A paging service is available in wireless wide-area networks (WAN) such as the General Packet Radio Service (GPRS), and CDMA data. Wireless local area network (LAN) protocols such as IEEE 802.11 also have the notion of a power-save state. That is, paging is deployed in these networks as a means for waking a mobile host from a standby or power-save state to an active state, at a single base station of the network. The paging architecture and protocols in each of the networks are defined independently and do not inter-operate. Because of this, seamless movement of the mobile host between local-area and wide-area networks, or between wide-area networks of different types, is precluded. The mobility protocol for IP networks set out in RFC 2002 does not disclose or suggest a paging feature with a view toward power conservation at an IP mobile host.

SUMMARY OF THE INVENTION

According to the invention, a method of paging mobile hosts over an Internet protocol (IP) network includes coupling base stations to the IP network wherein one or more base stations define associated paging areas, initiating a page request for a mobile host at a given node of the network when data on the network is addressed to the host and the host is in a standby state in which the host informs nodes of the network only when a new point of attachment with the network is a base station of a paging area different from a paging area of a last point of attachment with the network, and transmitting the request from one or more base stations in a current paging area for the host. When a page response is received from the host at a base station in the current paging area, updated routing information for the mobile host is developed from the page response. The data addressed to the mobile host is delivered to the host according to the updated routing information, when the host transitions to an active state.

According to another aspect of the invention, a method of operating a mobile host for linking with an Internet protocol (IP) network includes configuring the mobile host for assuming a selected one of an active state and a standby state, informing certain nodes of the network of a change of the host's point of attachment with the network from one base station to another base station when the host is in the active state, wherein the network has paging areas each of which includes one or more base stations, and informing the nodes only when a new point of attachment with the network is a base station of a paging area different from a paging area of a last point of attachment with the network, when the host is in the standby state. The host responds to a page request received from one or more base stations of a current paging area when in the standby state, by transmitting a page response for reception by one of the base stations and transitioning to the active state. Data on the network which was addressed to the mobile host while the host was in the standby state, is then received from one of the base stations in the paging area.

For a better understanding of the invention, reference is made to the following description taken in conjunction with the accompanying drawing and the appended claims.

BRIEF DESCRIPTION OF THE DRAWING

In the drawing:

FIG. 6 is a table showing results of the simulated implementation;

FIG. 11 is a table showing router processing under domain paging according to the invention;

FIG. 12 shows paging update processing in a base station or router according to the invention;

FIG. 13 shows paging initiation in a base station or router according to the invention;

FIG. 14 shows paging response processing in each base station or router according to the invention.

DETAILED DESCRIPTION OF THE INVENTION

Figure 1:
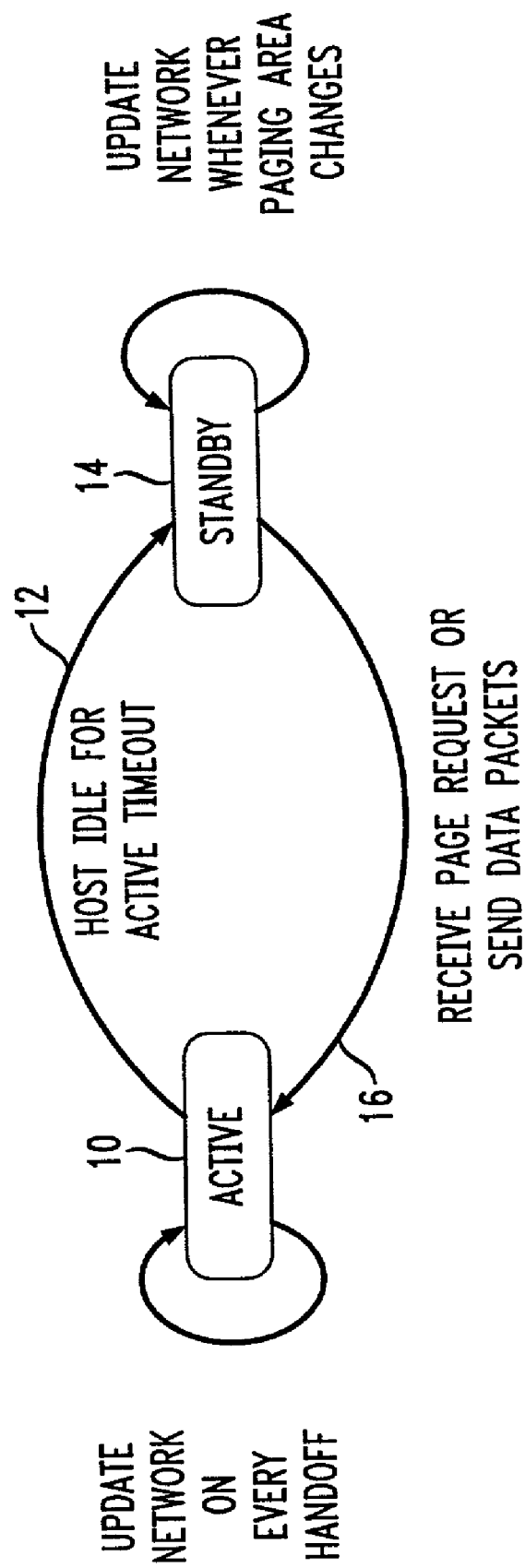
FIG. 1 is a state diagram of an IP mobile host, according to the invention.

FIG. 1 is a state diagram of an IP mobile host that is affiliated with an IP network, according to the invention. The host will be in one of two states as shown in the figure. When actively transmitting or receiving data to or from the network, the mobile host is in an active state 10. As long as the mobile host remains active, the network determines the precise location of the host by way of routing tables created at various nodes through which data to and from the host pass, per the following disclosure. Data on the network which is addressed to the mobile host will therefore be delivered quickly. If the mobile host is in the inactive state 12 for a certain period of time, however, the host will transition at 12 into an idle or standby state 14 during which state the host's location is not precisely known by the network. If data arrives in the network for the mobile host when in the standby state 14, the host must be located before data can be delivered reliably.

When in the active state 10, the mobile host will update the network each time it changes its point of attachment to the network, i.e., each time the host links with the network via a different base station having a corresponding IP address. When in the standby state 14, however, the mobile host updates the network only when the host links with a base station of a different paging area. Thus, if the mobile host spends sufficient time in the standby state 14, power saving is achieved by reduced transmissions of updates by the host. In accordance with the present scheme, the network also incorporates a paging feature to locate the mobile host when data addressed to the host is present on the network while the host is the standby state 14, and to transition the host at 16 to return to the active state 10.

Wireless networks that support paging typically have well-defined wireless link-layer paging support that allows a mobile host to listen to broadcast page messages periodically in an energy efficient manner. It is therefore preferred that IP paging protocols defined herein leverage such efficient link-layer mechanisms when page messages are transmitted according to the present scheme over wireless links between base stations and mobile hosts, and use IP messages only over wired links.

Figure 2:
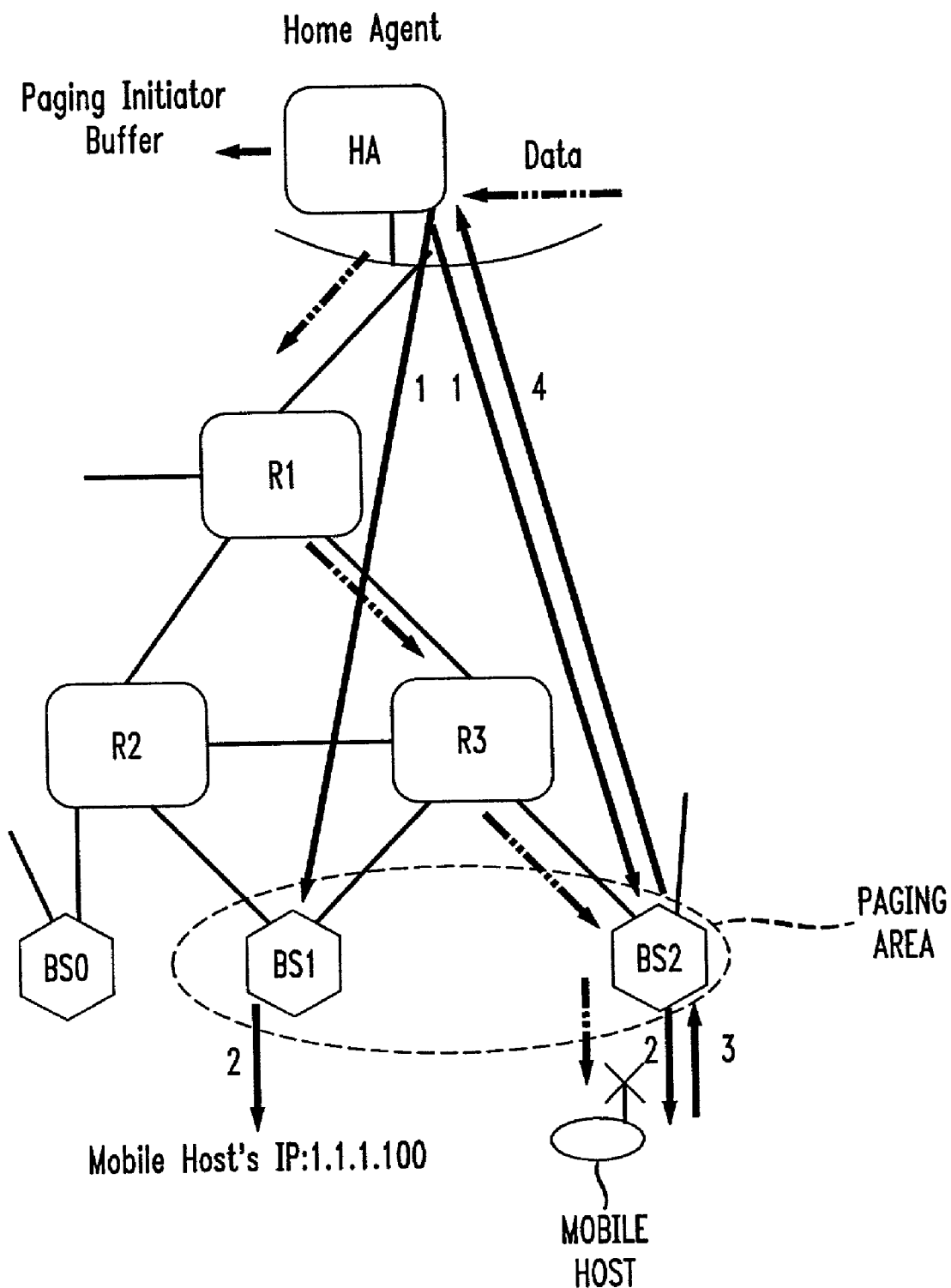
FIG. 2 shows part of an IP network configured for home agent paging according to the invention.
Figure 3:
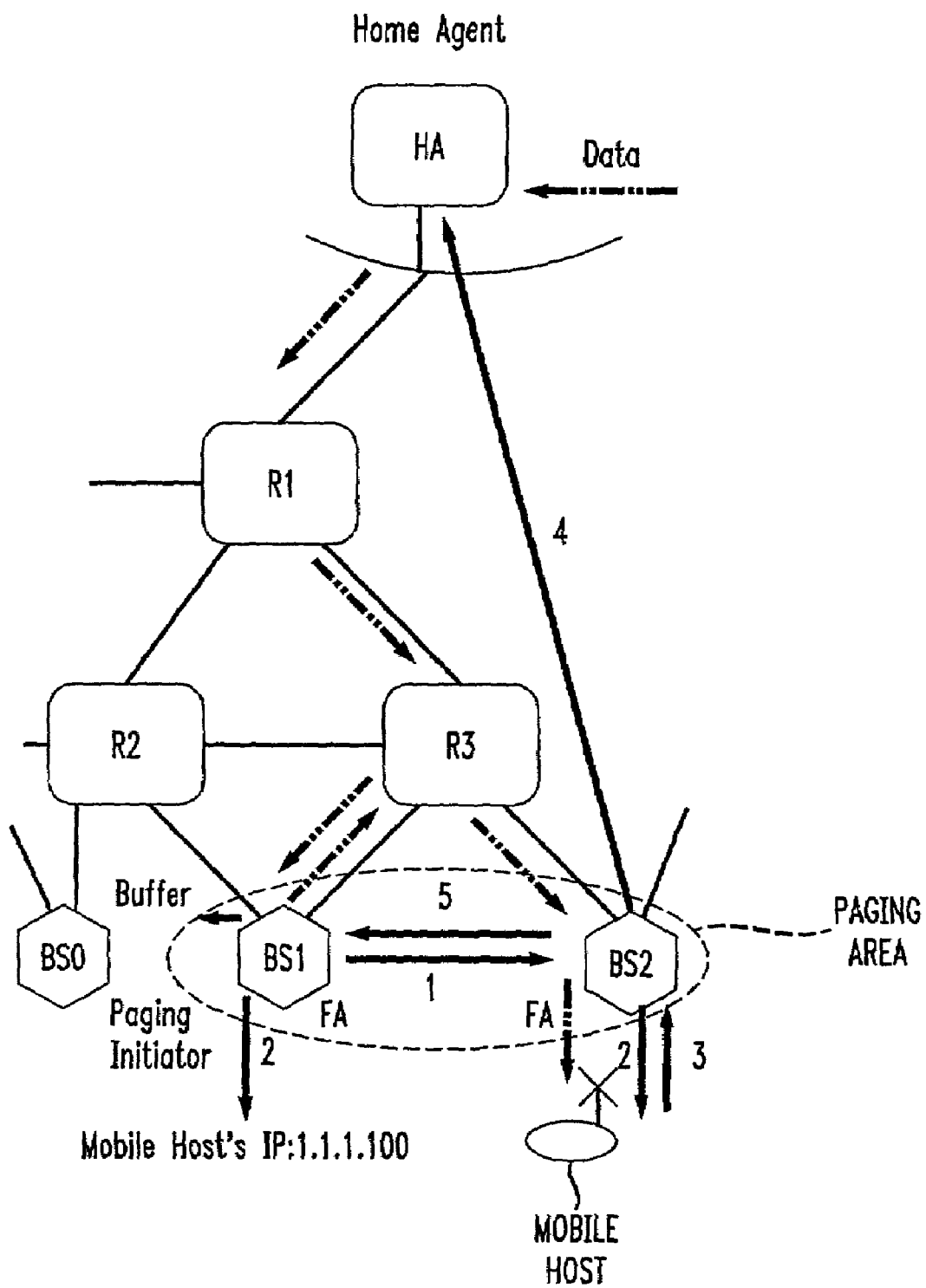
FIG. 3 shows part of an IP network configured for foreign agent paging according to the invention.

Mobile IP (e.g., RFC 2002) defines two entities to provide mobility support, namely, a home agent HA (see FIGS. 2 & 3), and a foreign agent FA (see FIG. 3). Foreign agents are identified by a "care-of-address". Packets sent to a mobile host are intercepted by the home agent, which then tunnels the data packets to the mobile host through the foreign agent using the care-of address. The foreign agent may be present at the base station, or run locally at the mobile host in which case the care-of address is known as a "co-located" care-of address.

Three systems for incorporating a paging feature for mobile hosts affiliated with an IP network are now described. The first is referred to herein as "home agent paging". In this system, when data arrives at the home agent for a mobile host that is in the standby state 14 of FIG. 1, the home agent HA initiates paging procedures to a predetermined set of foreign agents. This system, presented in FIG. 2, is centralized at the home agent.

A second, more distributed system represented in FIG. 3 is referred to herein as "foreign agent paging". In this system, the home agent HA always has a record of the last foreign agent FA (base station) serving a mobile host. When packets for the mobile host arrive at the home agent HA, they are forwarded to the last known foreign agent FA which then initiates paging procedures among other foreign agents (base stations) in the paging area of the last known foreign agent.

Figure 4:
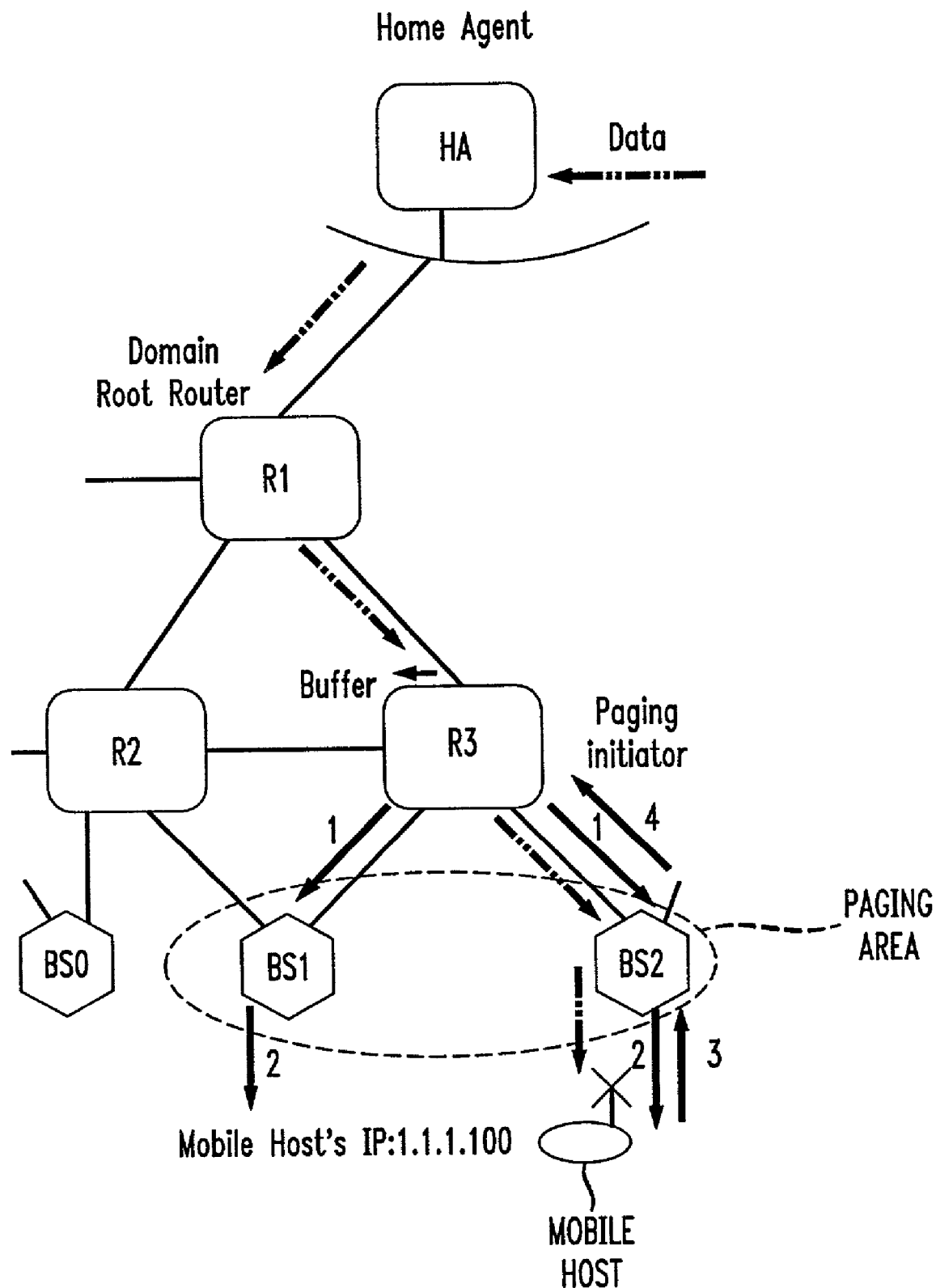
FIG. 4 shows part of an IP network configured for domain paging according to the invention.

A third, fully distributed approach is referred to herein as "domain paging". As seen in FIG. 4, paging may be initiated by any network router R within the paging area of a mobile host in the standby state 14. Updates from the host while in the standby state are processed by selected routers R within the domain of the paging area.

Home Agent Paging

Home agent paging (FIG. 2) is performed in a centralized manner by a designated mobile IP home agent HA. When a mobile host registers with its home agent HA, the host includes information that identifies the host's current paging area. When a packet destined for a mobile host arrives at the home agent while the host is in the standby state 14, the home agent buffers the packet, and then contacts all base stations (e.g., BS1, BS2) in the paging area via message 1. The base stations BS1, BS2 subsequently page over the air via message 2. The mobile host is configured to receive the page message while in the standby state 14, and to register its location with the home agent via messages 3 and 4. Home agent HA then delivers the buffered and all subsequent packets to the mobile host. Under the present scheme, a paging area may be identified using an IP multicast address. The use of multicast for paging under the present scheme is discussed further below.

Home agent paging may be characterized as centralized because the paging initiator (home agent HA) is a statically determined, centralized entity. This results in a relatively simple protocol implementation that is required only at the home agent HA and the mobile host. The protocol is flexible in that different update and paging algorithms may be implemented in the home agent and its associated mobile hosts. Because home agents may be located some distance from their mobile hosts, search costs may be high resulting in reduced efficiency. Also, since home agents in wide-area wireless networks are expected to serve thousands of mobile users, increasing the scalability of the centralized home agent may also result in high costs. For the same reason, the failure of a home agent or paging process in a home agent would render all the mobile hosts it serves as unreachable, decreasing reliability. Notwithstanding, these are common characteristics when using home agents for data delivery under present IP mobile routing protocols.

In terms of deployment, the home agent requires the addresses of all base stations in the paging area. Since the base stations and the home agent may belong to different administrative domains, the paging information may be considered confidential and not available. Also, for a home agent to support global roaming of its mobile hosts, it would have to access databases with network configuration information for every accessed network, which may be problematic.

Foreign Agent Paging

Foreign agent paging (FIG. 3) addresses many issues raised with respect to home agent paging. In foreign agent paging, paging is initiated from the mobile host's last attached foreign agent, e.g., base station BS1 in FIG. 3. When a packet destined for a standby mobile host arrives at the home agent HA, the home agent tunnels the packet to the foreign agent as in basic Mobile IP under RFC 2002. Because the home agent is unaware of the standby state of the mobile host, the foreign agent (BS1) then buffers the packet and contacts all other base stations (e.g., base station BS2) in the paging area (message 1), and all of the base stations BS1, BS2 in the paging area then transmit a page message over the air (message 2). The mobile host then registers its new point of attachment to base station BS2 with the home agent (messages 3 and 4). Simultaneously, the mobile host informs its previous serving base station BS1 of its new point of attachment (message 5), so that the packet buffered at BS1 can be forwarded to BS2 for delivery to the mobile host. If the mobile host happens to remain attached to its previous base station when re-entering the active state, messages 4 and 5 are avoided.

Foreign agent paging may be viewed as quasi-centralized, because while paging for a given mobile host is distributed among the different foreign agents in the network, the paging initiator is statically determined and fixed to be the host's previous foreign agent, at any given time. The approach is relatively easy to implement, and also provides scalability since the processing load for paging of mobile hosts is distributed among different foreign agents (base stations) in the network. Furthermore, the confidentiality issues of home agent paging are avoided since paging is localized to one administrative domain, making the system efficient and deployable. The system is fairly flexible in that different update and paging algorithms can be implemented in the mobile hosts and the foreign agents, and it is compatible with a basic mobile IP network as defined in RFC 2002. The approach may not work with the mentioned mobile host CCOA option, however.

In foreign agent paging, reliability concerns are more serious than in home agent paging. In the latter, a home agent failure would leave the mobile host disconnected. In foreign agent paging, in addition, even in the presence of an end-to-end path to the mobile host, the failure of the previous foreign agent could result in the mobile host becoming unreachable indefinitely since the previous foreign agent (base station) is the paging initiator. While foreign agent paging may be similar in some respects to paging in cellular data networks such as GPRS or CDMA in that paging is initiated in a current serving area of a mobile host, an important difference is that the cellular networks rely on link level protocols to disseminate paging information to the base stations. In the present foreign agent paging scheme, however, the foreign agents are the base stations, and Internet protocol is used to distribute the paging messages.

Domain Paging

To address any shortcomings of the disclosed home agent and foreign agent paging schemes, a router assisted paging scheme referred to as domain paging is now described. In domain paging, the paging load is distributed among routers and base stations in a given domain, rather than at one fixed node such as a foreign agent or a home agent. As used herein, a "domain" is an autonomous system in the Internet such as a stub domain in the transit stub domain model of the Internet. See K. Calvert, et al., Modeling Internet Topology, IEEE Communications Magazine, June 1977, all relevant portions of which are incorporated by reference. The gateway into each domain is called a domain root router. These routers and the base station in the path from the domain root router to a given mobile host operate to maintain routing and paging information for that mobile host, while other routers in the domain have no specific knowledge of the same mobile host.

According to the present domain paging scheme, when a mobile host is in the active state 10 in FIG. 1, it sends an update message to the domain root router R1 in FIG. 4 whenever the host moves out of service from a current base station (e.g., BS1). When the mobile host is in the standby state 14, it sends an update message to the domain root router R1 only when it moves out of its paging area, i.e., leaves service of both BS1 and BS2. The update messages are propagated hop-by-hop along a path from the mobile host's current base station to the domain root router R1, thus creating new routing and paging information on each router/base station in the path. Note that in the home and the foreign agent paging schemes, such updates would result in creating a new tunnel between the home agent and the foreign agent. The identity of the domain root router is periodically advertised in all paging areas of the domain. If routers in the domain do not support domain paging, this reduces to foreign agent paging.

In FIG. 4, let the foreign agent be co-located with the mobile host, i.e., the CCOA option of Mobile IP. The paging area is identified using an administratively-scoped IP multicast group address (e.g., 239.0.0.1). When a packet is received by the home agent for the mobile host when in the standby state, a router or base station along the path from the domain root router R1 to the last (recorded) base station of the mobile host, dynamically selects itself to be the page initiator, e.g., router R3 in FIG. 4. The page initiator R3 buffers the packet and then sends out a page request for the mobile host to all base stations in the paging area (message 1). On receiving a page request (message 2) the mobile host sends a page response through the serving base station (BS2) to the initiating router R3 (message 3). This page response also propagates hop-by-hop thereby updating the routing and the paging information for the mobile host along the path (message 4). On receiving the page response, the page initiator R3 transmits the buffered packet which is now routed to the mobile host with the help of the routing states created by virtue of the page response. Any future packets addressed to the mobile host are then routed as was the buffered packet. Note that paging functionality can be implemented in a router without affecting its fast path forwarding prowess through the use of virtual interfaces as described below. Further details concerning domain paging procedures are also set out later below.

A decision as to whether to initiate paging from a router or from a base station is preferably configurable. That is, the decision depends on how much of the paging load needs to be shared by each router or base station. One possible measure of paging load, which is used in the present disclosure, is the number of outstanding paging requests.

The distribution of paging functionality among routers and base stations in a given domain serves the dual purpose of load balancing for performance, and fail-over for reliability. When a given base station or router fails, paging can be initiated from another node using a simple soft-state refresh mechanism.

One may view domain paging as a generalization of foreign agent paging, where a base station or a router is dynamically selected as the paging initiator thus resulting in a completely distributed approach. This avoids the potential reliability issues with foreign agent paging, while retaining the scalability and the efficiency benefits of a distributed approach. Domain paging is flexible and allows multiple paging algorithms to be implemented. Also, since domain paging is localized to one administrative domain, the confidentiality issues of home agent paging are avoided. Furthermore, unlike foreign agent paging which could generate updates to a home agent (message 4 in FIG. 3), domain paging is truly localized with no updates to the home agent due to paging. And, unlike home agent and foreign agent paging, domain paging works with both the co-located care-of option of mobile IP as well as the network-based foreign agent option.

Domain paging does, however, require additional functionality in routers of wireless network domains for buffering of packets destined to standby mobile hosts at the page initiators, and for processing and maintaining paging state information at the routers. Incremental updates of selected routers with the present paging functionality may facilitate deployment of domain paging in existing cellular wireless networks.

The events involved in domain paging in FIG. 4 may be as follows. A data packet arrives at router R1 when the mobile host is in the standby state. Based on routing entries established during an earlier update from the mobile host (and the knowledge of a determined active timeout value), router R1 notes that the mobile host is in the standby state. Router R1 runs a simple procedure, described later below, to determine if it can be a paging initiator. On determining that it cannot be the paging initiator, possibly due to a large number of outstanding paging requests, router R1 forwards the packet downstream toward router R3. Router R3 performs similar processing and determines that it should become the paging initiator. It then buffers the data packet(s) addressed to the mobile host, and sends a page request (message 1) to a multicast group address for all base stations in the mobile host's paging area. Base stations BS1 and BS2, which belong to the addressed multicast group, receive the page request and each broadcasts a page (message 2) over their respective wireless interfaces. The mobile host then sends a page response (message 3) which is received at base station BS2. The response triggers a hop-by-hop message from base station BS2 to the paging initiator (message 4), router R3. The buffered data packets as well as any later arriving packets addressed to the mobile host, are then forwarded to the mobile host through the base station BS2.

Paging Algorithms

Paging algorithms determine how and where (via which base stations) a mobile host is searched. In the three paging protocols discussed above, it was assumed that all base stations in a paging area transmit a page request message simultaneously. Such a paging algorithm is referred to herein as a fixed paging algorithm. More sophisticated algorithms, which search a paging area hierarchically or exploit locality of user movement (termed hierarchical and last-location, respectively), have been proposed and studied in the context of networks other than IP. See T. Woo, et al., "Update and Search Algorithms for Wireless Messaging", Infocom '98, all relevant portions of which are incorporated by reference. The known paging algorithms are briefly described below.

Fixed Paging

In fixed paging, base stations that comprise a paging area are fixed by a network administrator. Thus, the network will know a current paging area of a mobile host, and a page request message can be directed to all the base stations in the paging area.

Hierarchical Paging

This is a generalization of fixed paging. The paging area is divided into hierarchies by the network administrator. The network pages certain base stations at a first level of hierarchy. If there is no response within a timeout interval, the network pages through other base stations at a next level of hierarchy, and this process is repeated until the entire paging area is searched.

Last-location Paging

In last-location paging, a network first pages only through a last known base station serving the mobile host. This base station could be inferred from the last update message, or from a call initiated by/to the mobile host. If there is no response from the host within a certain timeout interval, the network then pages through all other base stations in the paging area. For networks with low mobility users, probing a user's last known location can reduce the paging load significantly.

Implementation

A simulation of a typical implementation of domain paging is now described. The two main goals for the implementation were to:

(1) Show how paging functionality can be implemented in a router (though PC-based) without affecting its fast path forwarding prowess; and (2) Measure processing times associated with different paging operations in a real system.

Domain paging was chosen for simulation since it has the main functionality of both home agent paging (when a router initiates paging) and foreign agent paging (when a base station initiates paging), thus serving as a superset of all three protocols. Each of the three paging algorithms, described above, was evaluated for use with the domain paging protocol.

Figure 5:
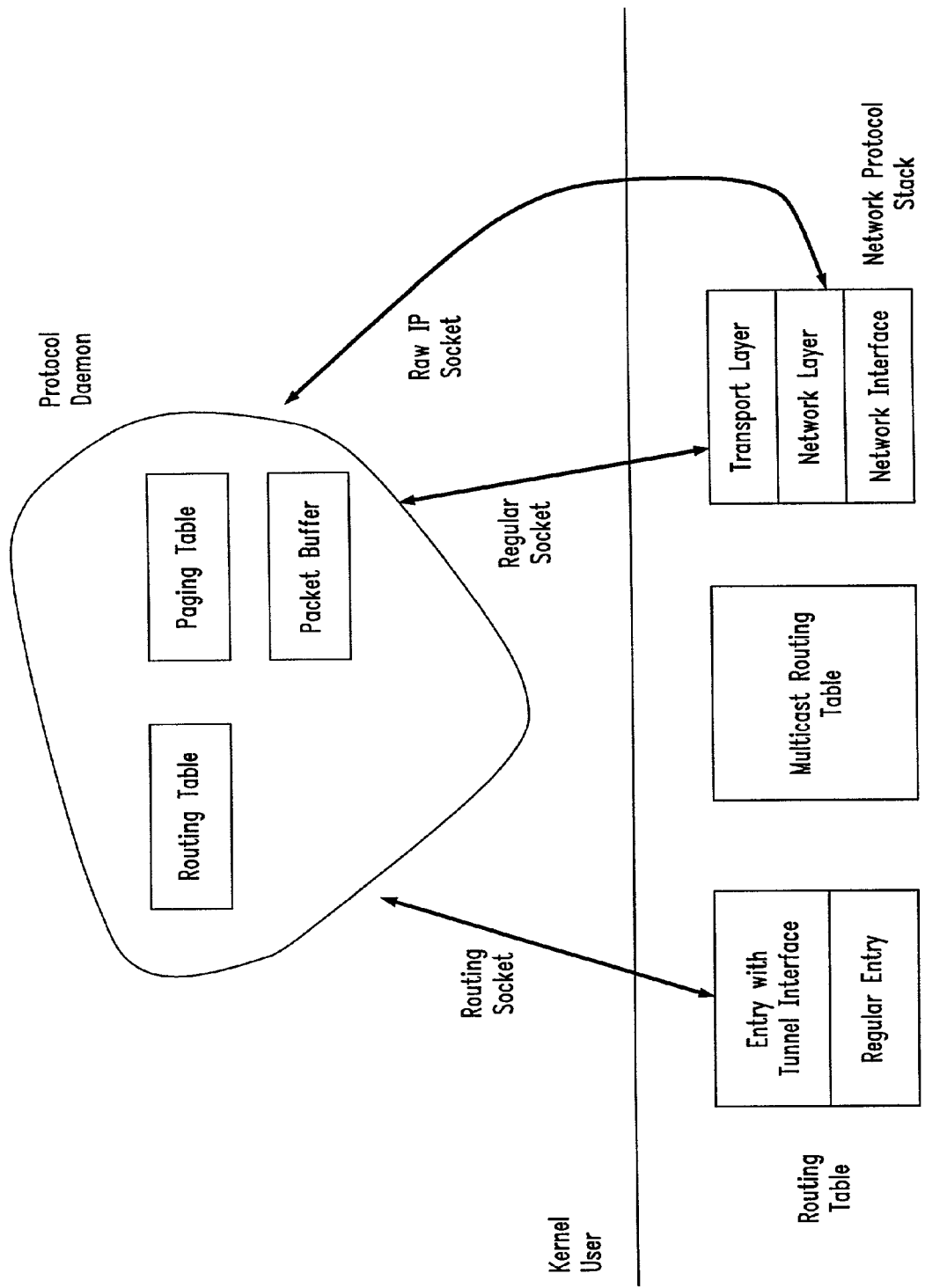
FIG. 5 shows software architecture of a simulated implementation of domain paging according to the invention.

The implementation platform was a PC-based router running the available FreeBSD 3.1 operating system. Equivalent functionality, such as virtual ports, is also available on most routers and the implementation could be adapted for them. FIG. 5 illustrates the different components of the protocol software, and its interaction with the kernel. The paging protocol is implemented in user space, and sends/receives protocol messages on a well-known UDP port. This allows for ease of testing and deployment.

Recall from FIG. 1 that mobile hosts may be in one of two states, the active state 10 or the standby state 14, and that paging is initiated only when the host is determined to be in the standby state. Since the paging daemon is implemented in user space, it is most efficient if only packets destined for mobile hosts that are in the standby state are sent to the user level paging daemon, while packets destined for mobile hosts in the active state are forwarded in the kernel itself. This was achieved through the use of a tunnel interface in FreeBSD. The tunnel interface is a pseudo network interface that delivers packets to user level processes. The paging daemon simply maintains the kernel routing entries through the routing socket interface such that routing entries for active mobile hosts point to real outgoing interfaces. When the mobile hosts are idle and after a timeout transition to the standby state, the paging daemon changes the respective routing entries to point to the tunnel interface. Thus, the paging protocol selectively receives only those packets for which paging is necessary, while the kernel forwards all incoming packets as usual in a fast path.

One issue with initiating paging is the need for the daemon to know on which interface the packet arrived. See line 2 in FIG. 13 and related text below. Since the FreeBSD tunnel interface does not provide interface information with a data packet, a new ioctl option was added to pass the interface information from the kernel to the paging protocol daemon in the user address space with each data packet. The new ioctl option required adding about 10 lines of code in the kernel.

When a page response was received, the paging initiator updated the kernel routing entry for the mobile host, and used the raw IP socket to deliver buffered IP packet(s) to the mobile host. Subsequent IP packets for the mobile host were forwarded directly by the kernel.

A testbed included one PC serving as a router, two PCs serving as base stations, and a mobile host. The router was connected to the base stations through a 100 Mb/s Ethernet and the mobile host was connected to the base stations through a 2 Mb/s WaveLAN. The CPU processing times for different aspects of paging protocol processing according to the present schemes, were measured. All measurements were obtained on 333 MHz PCs running the FreeBSD 3.1 operating system.

Each experiment involved sending a series of ICMP echo request (ping) packets, with a period of one second, to a given mobile host. When a packet arrived at the testbed domain, the ICMP packet was buffered and a page request was initiated under the present domain paging protocol. When the mobile host responded to the page request from one of the base stations, the buffered ICMP echo request packet was forwarded to the mobile host, which then replied with an ICMP echo reply packet. Thus, the latency for the first ping packet included the cost of paging. Subsequent ping packets were routed along the fast path, resulting in no paging overhead. The experiment was repeated over 100 times to obtain various paging processing timings in the presence of paging.

Note that with the domain paging scheme, paging can be initiated either at a router or at a base station. The processing needs of router initiated domain paging and base station initiated domain paging are comparable to the processing needs of home agent paging and foreign agent paging respectively. In the Table of FIG. 6, results are presented for both possibilities of page initiation, for each of the three paging algorithms (fixed, last-location, and hierarchical). FIG. 6 also shows results obtained for the two cases of whether a user was located at a previous base station (found) or not (not).

The domain paging implementation of FIG. 6 may be classified into four main functions:

"init\_page\_request"—receive the IP data packet from the tunnel interface, buffer the packet, and initiate a page request to appropriate base station(s);

"retry\_page\_request"—increment page request sequence number and send page request to different base stations;

"recv\_init\_page\_request"—receive the page request and initiate a page request over the air interface; and "recv\_page\_response"—receive the page response, update the paging/routing entry in the kernel, and, if necessary, forward the response to the initiator.

Also note that there are minor differences in functionality, depending on whether the function is implemented at a base station or in a router. Further, it does not matter under the "fixed" scheme whether or not a user is at a previous base station when a router initiates paging, so the first two columns in FIG. 6 for "Router initiated" are identical.

Some interesting observations may be made regarding the measured processing times. Consider the case when a router is initiating the page and the user is found at a previous location. See the first line in columns 2, 4, and 6 in FIG. 6. The init\_page\_request processing times at the router using the fixed and the hierarchical algorithms are 0.173 ms and 0.196 ms, respectively. But the same item is 0.323 ms for the last-location algorithm. The reason is that the last-location scheme needs to perform a route lookup in the kernel in order to send a unicast paging request to the right base station, while in the fixed and the hierarchical cases, a page request was just sent to the appropriate multicast group. Another observation is that, in general, recv\_page\_response is more expensive than other processing (0.2–0.4 ms vs less than 0.2 ms for init processing), because only recv\_page\_response processing involves updating the kernel fast path routing entries.

The measured paging processing times from FIG. 6 were then used to compare the paging latencies of different paging protocols in a simulator that simulates a highly loaded network with millions of users and up to hundred nodes. While the measurements of FIG. 6 assumed that processing is devoted solely to paging, paging processing will need to share CPU resources with other protocols and administrative tasks in a typical network router. Thus, while qualitative results described below will still hold true in a deployed system, processing paging protocol messages in real network may cause a bottleneck at lower loads than those simulated. That is, absolute processing time values for the various paging tasks is likely to be scaled higher in a deployed system due to the need for performing several administrative tasks, for example, statistics collection, database access, or the like.

Performance Results

The present paging protocols were simulated using the different paging algorithms, in order to characterize paging latency and updates. The paging processing measurements from FIG. 6 and mobility and call traces available from "Stanford University Mobile Activity TRAces", on the Internet at <www-db.stanford.edu/pleiades/SUMATRA.html>, were used to drive the simulator. These mobility traces have been shown to provide a realistic framework for modeling connection oriented traffic in personal communication networks, and have been corroborated using measurements and surveys of actual human activities. The simulation results used two traces of one hour duration, one representing wide-area traffic and the other representing local-area traffic, called Bay Area Location Information (BALI) and Stanford University Local Area (SULA), respectively. In addition to call traces, trace information was added representing paging due to messaging traffic in order to simulate higher paging load representative of future applications. The inter-arrival time between two messages to a given user is assumed to be exponentially distributed, as in T. Woo, et al., cited earlier.

Call trace details contain a caller's identity and zone, the callee, the callee's zone, and the time at which the call is initiated. Trace time granularity is in minutes. Calls were assumed to be uniformly distributed over the minute to get a more accurate granularity. It was assumed that the callee was in a standby mode and, therefore, paging was necessary to deliver the call. Mobility trace details contain the user, originating zone, target zone, and the time.

The simulation network topology of BALI is the San Francisco Bay area with 90 zones. The zones can be mapped logically to base stations, since handoffs in currently deployed networks will occur initially only across these zones rather than at base stations. The simulation network topology of SULA is 36 zones in a six-by-six wrapped mesh. The total number of users is about 1.8 to 2 million in each of the traces, thus making SULA a more dense network than BALI. The trace file contains call and mobility details. Each call trace is mapped to a paging event for the callee. The paging load due to such calls is up to 2 pages/hr/user. In addition, the paging load due to simulated messaging traffic is up to 60 pages/hr/user.

In order to simulate IP paging in the network, the zones were divided into paging areas. In the simulated network topology, each set of six neighboring zones forms a paging area. The domain has a router hierarchy of two, with one mid-level router for each paging area, and one domain root router.

The two metrics of interest are average paging latency for delivering a packet to a paged host, and the number of updates to the home agent due to paging and movement of mobile hosts. It is essential to keep the average paging latency low, since this directly contributes to the delay in contacting the user. It is also important to the keep the number of updates to the home agent low so that cross-network traffic and home agent processing overhead are reduced.

A. Paging Latency

Figure 7A:
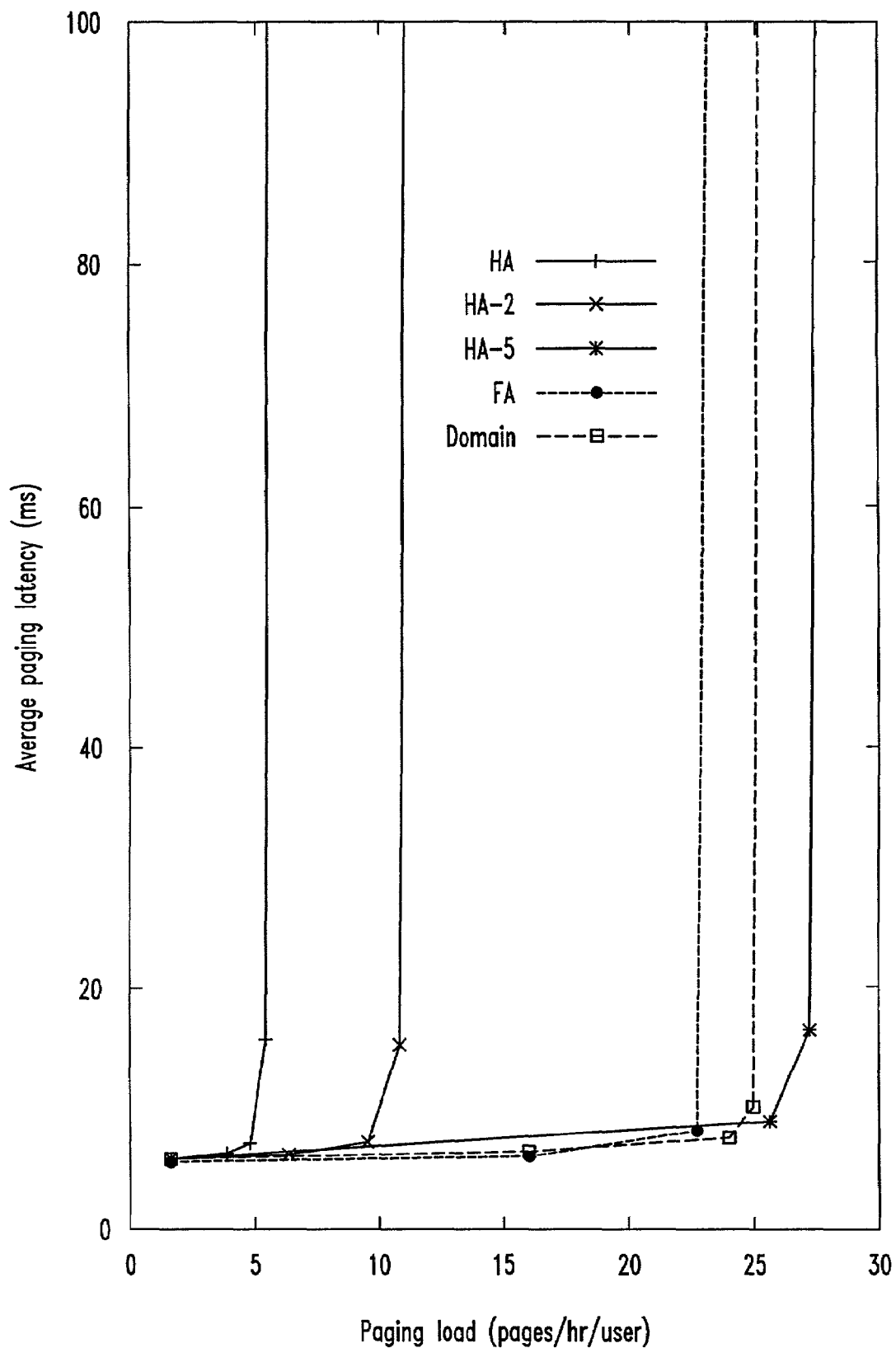
FIGS. 7(a) & 7(b) are plots of paging latency versus paging load.
Figure 7B:
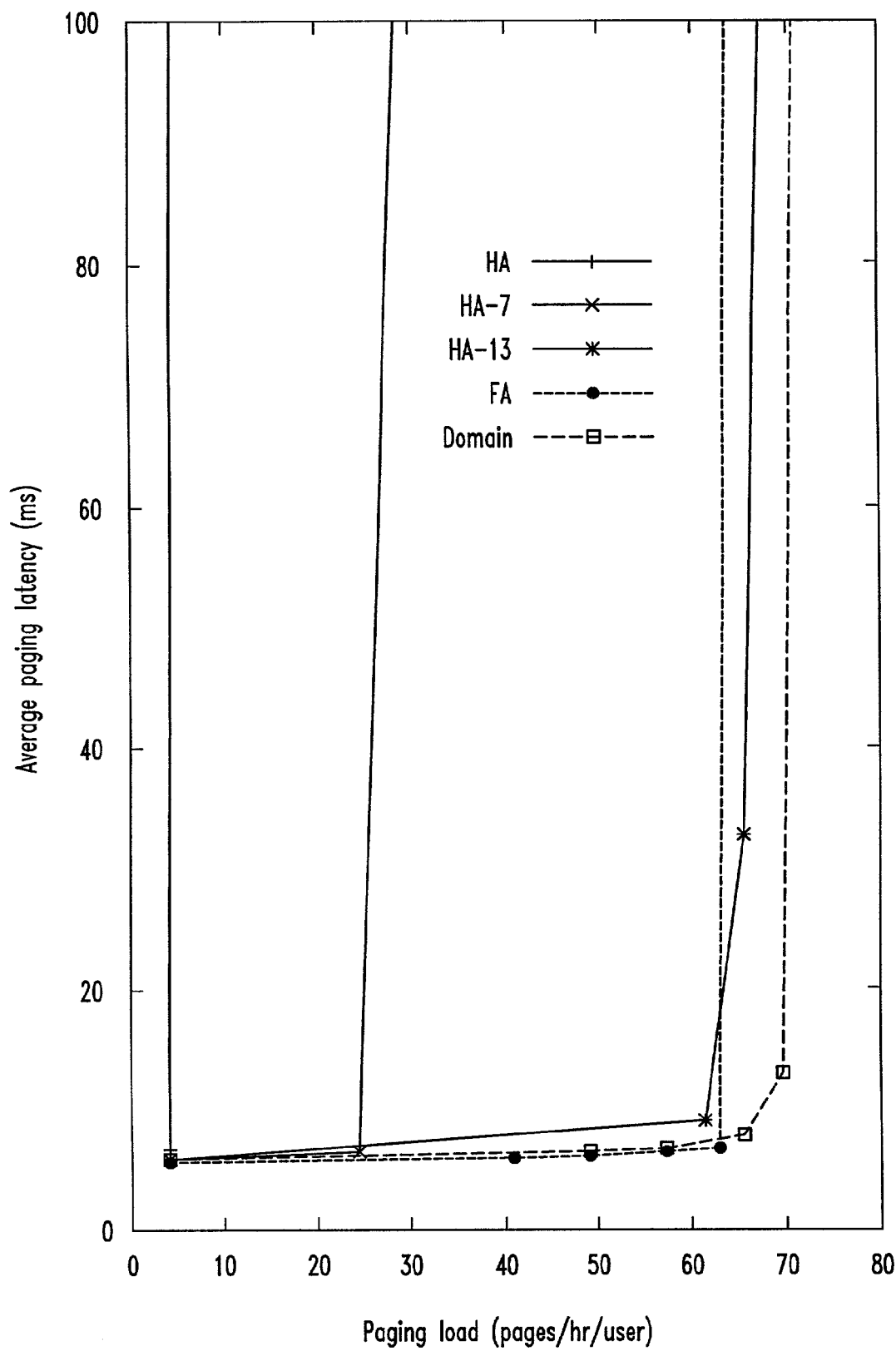

In FIGS. 7(a) and 7(b), average paging latencies were plotted for different paging loads in the SULA (FIG. 7(a)) and the BALI (FIG. 7(b)) traces, using the home agent, the foreign agent, and the domain paging protocols. Paging loads are measured in number of pages/hr/user. The fixed paging algorithm was used with a paging area size of six zones.

In order for home agent paging to scale to reasonable loads, multiple processors were used for a single home agent, and mobile hosts were statically mapped to the different home agent processors uniformly. It is seen from FIG. 7(a) that home agent paging with just one processor does not scale well with load, since the centralized home agent becomes a bottleneck. In order to achieve comparable performance with domain and foreign agent paging, home agent paging needs 5 and 13 processors for the SULA and the BALI traces, respectively.

There are two reasons for the difference in the number of home agent processors needed for the two traces. First, BALI has more zones (90) than SULA (36), thus requiring higher overall processing. Second, SULA has some hot-spot zones, but the load at the home agent still remains uniformly distributed. Thus, the complexity of the topology where users are roaming and how the load among the home agent processors is divided, may affect the scalability of home agent paging in unpredictable ways.

Now consider foreign agent and domain paging. In this topology with six zones in the paging area, foreign agent paging uses six base station processors for processing, while domain paging uses one additional mid-level router as well. By using the router, which gives 16 percent gain in processing power, domain paging is able to support about an 11 percent higher paging load over foreign agent paging in this particular configuration at 100 ms latency. Further, experiments (not shown) also indicated that the additional processing power reduced the 99th percentile paging latency more significantly than the average latencies. Thus, it may be concluded that domain paging is able to support the highest call load among the three protocols, by efficiently utilizing available processing resources (routers) in the domain.

B. Impact of Varying Paging Area Size

Consider the impact of paging area size. Having a larger paging area reduces the number of updates to the home agent, since the user sends an update when in the standby state only when the user crosses a paging area. But, a larger paging area implies that the user will need to be paged in more zones, resulting in higher processing load and higher paging latency. Thus, there is a trade-off between latency and number of updates that impacts the desired paging area size.

Figure 8A:
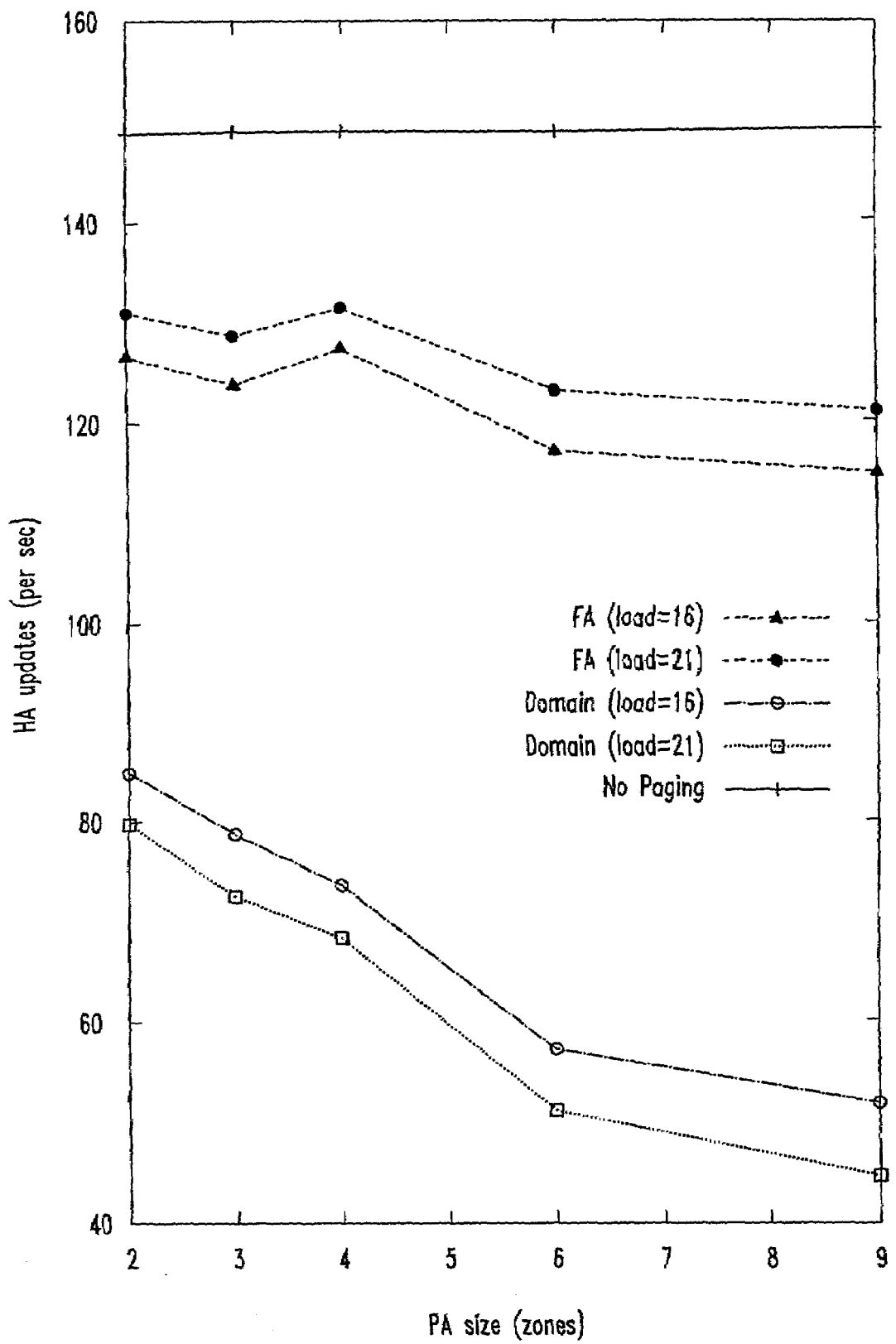
FIGS. 8(a) & 8(b) are plots showing impacts of paging area size.

FIG. 8(a) shows the number of updates to the home agent, versus different paging area sizes for foreign agent and domain paging at different loads (home agent paging, not shown, results in a very high number of updates because each page request results in an update). The number of updates when there is no paging is 149/s. When the paging area size is 9, the number of updates in foreign agent and domain paging is reduced by 19% and 72% respectively. In the case of foreign agent paging, recall that apart from movement related updates, updates to the home agent occur in cases when the user is paged and is found at a new foreign agent (message 4 in FIG. 3). This results in a higher number of updates than in domain paging where there are only movement related updates, and no updates when the user is paged (FIG. 4). Thus, domain paging showed the least number of updates to the home agent.

Figure 8B:
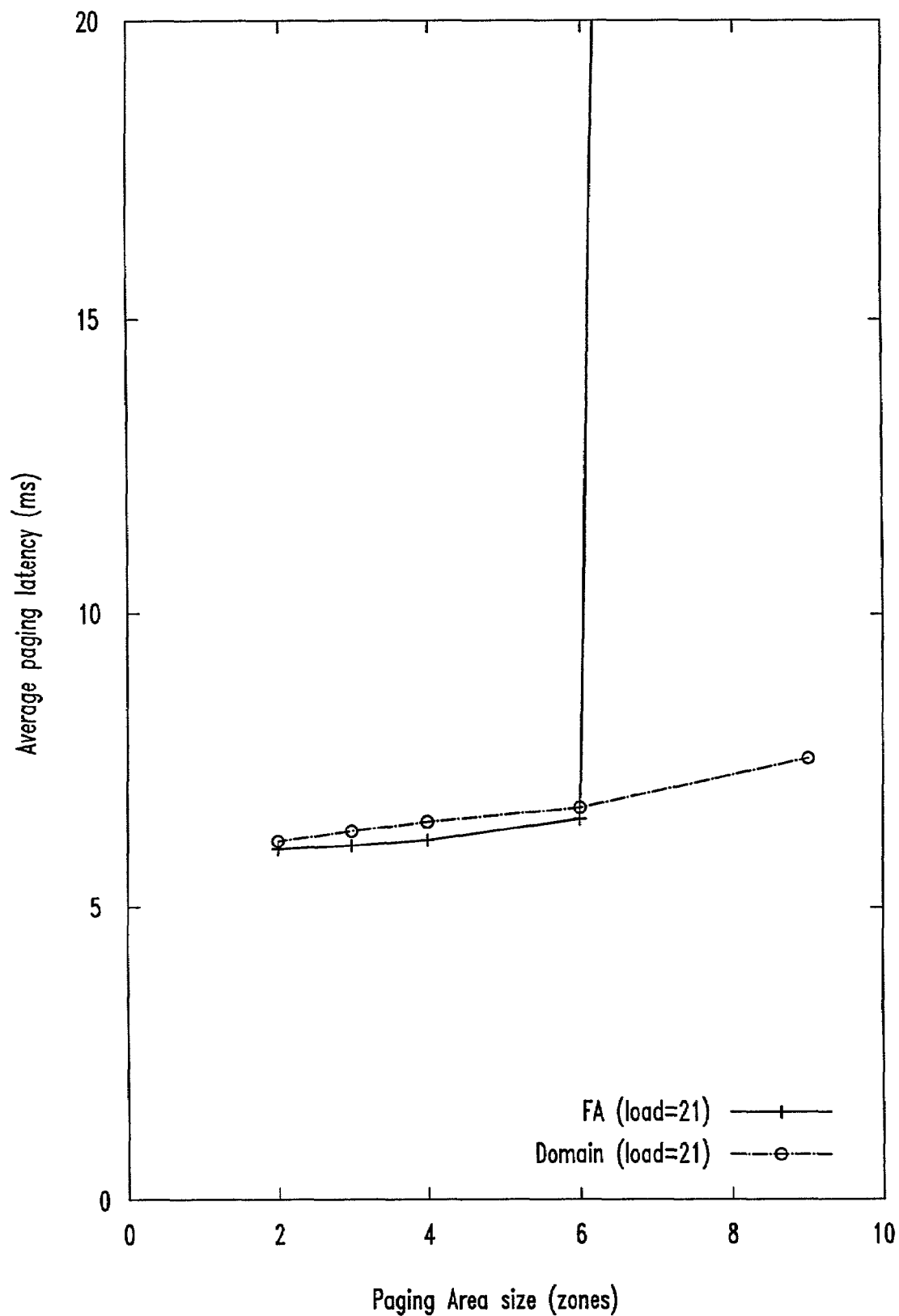

Now consider FIG. 8(b), where paging latency is plotted against different paging area sizes for foreign agent and for domain paging. As expected, paging latency increases with paging area size due to an increased paging processing load. Since domain paging uses routers in the network in addition to the base stations, however, domain paging is able to support higher paging area sizes than foreign agent paging. In the figures shown, domain paging is able to support paging area sizes from two to nine, while foreign agent paging is unable to support a paging area size of nine (the paging processors get overloaded). Finally, a paging area size of six seems optimal for this trace, resulting in low latency and lower updates to the home agent.

C. Impact of Varying Paging Algorithms

Figure 9A:
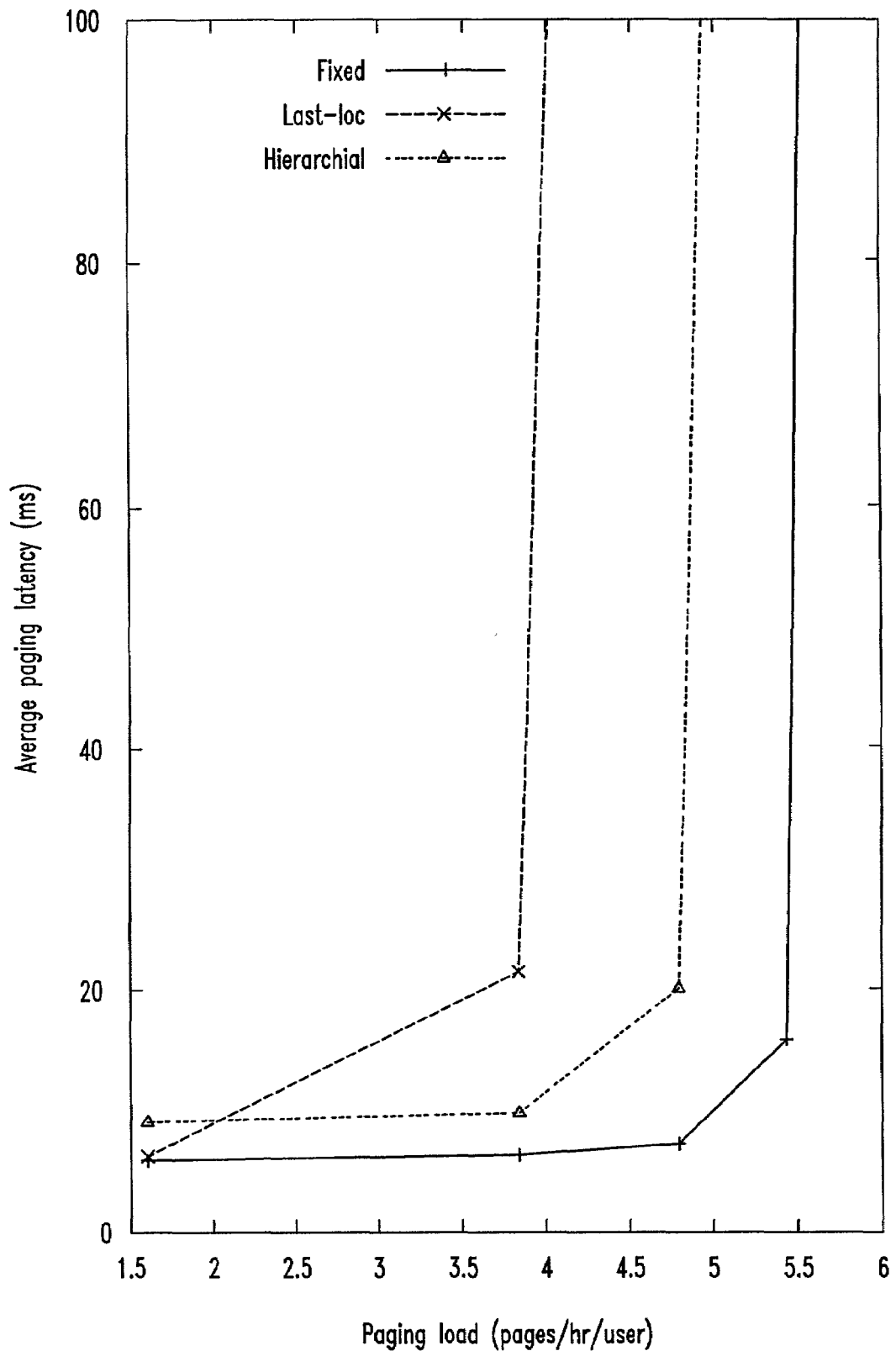
FIGS. 9(a) to 9(d) are plots showing the impact of different paging algorithms.
Figure 9B:
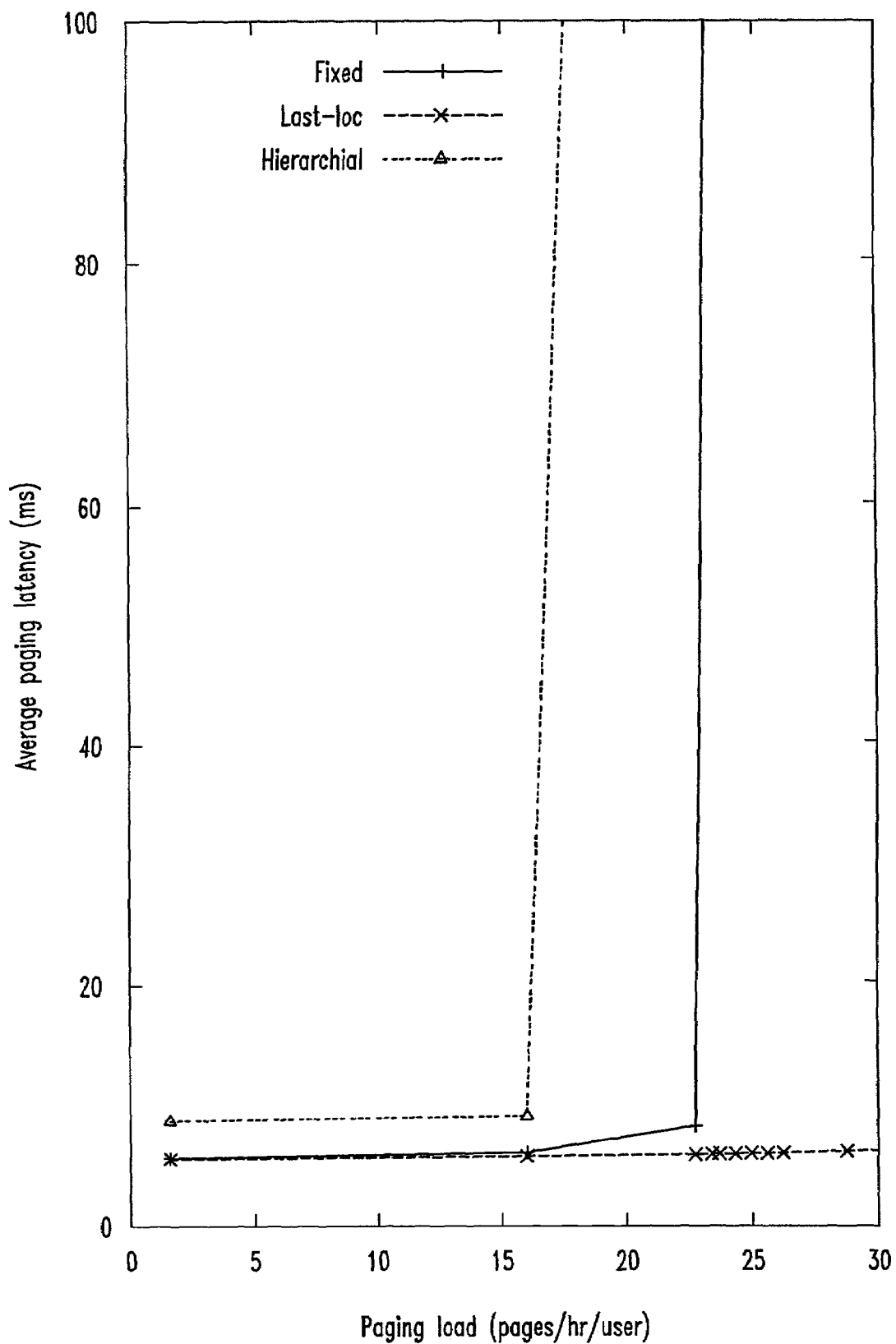
Figure 9C:
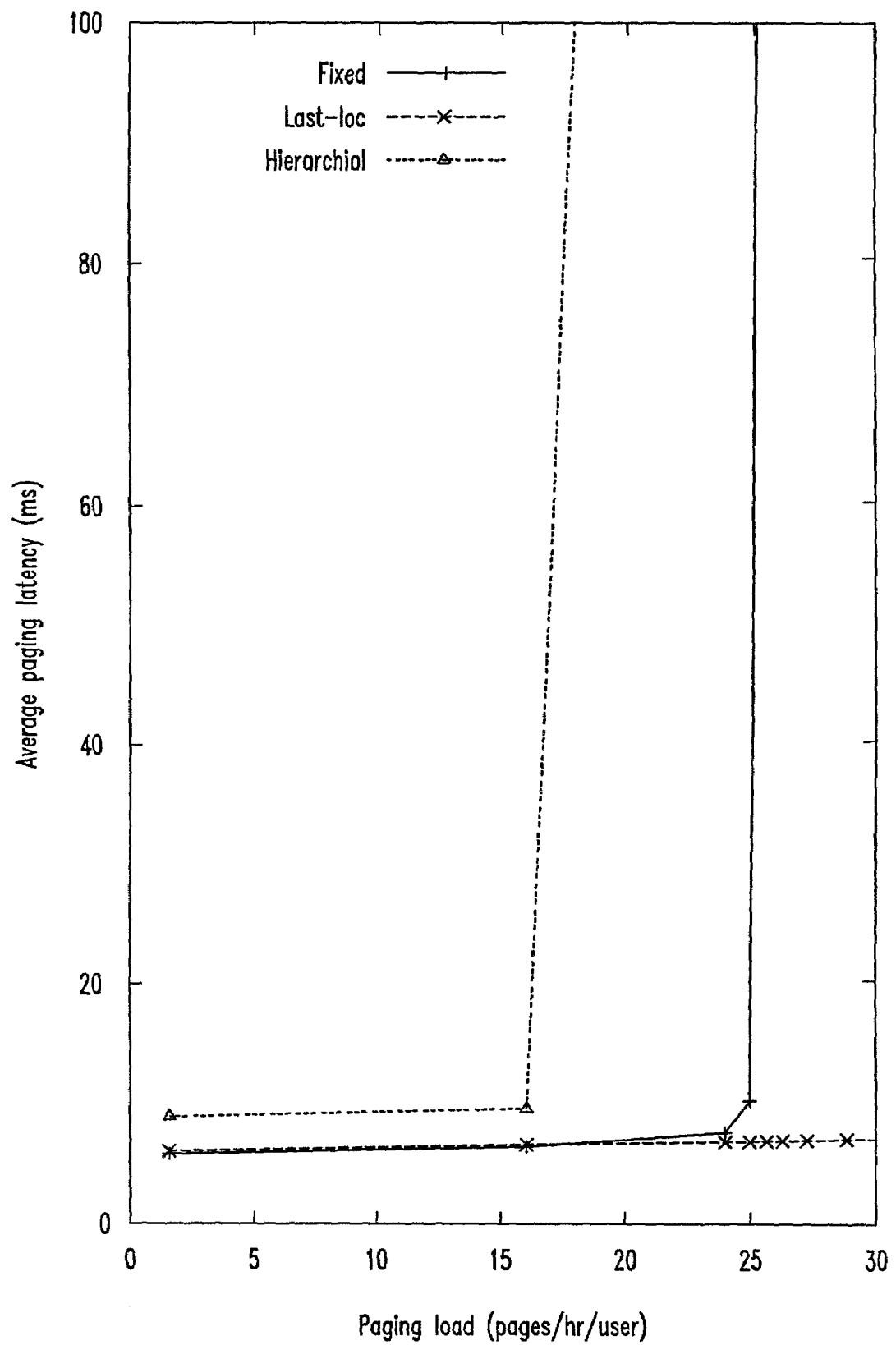

Now consider differences due to the three paging algorithms; fixed, last-location, and hierarchical. In FIGS. 9(a), (b) and (c), the impact of the three algorithms is plotted for each of the three present paging protocols. The results embody the SULA trace, where user mobility is low (high locality).

In the case of home agent paging in FIG. 9(a), the last-location algorithm performs worst while the fixed algorithm performs best. This seemingly unexpected result, even in the presence of high user locality, has a reasonable explanation; The last-location algorithm increases the load at the initiator (FIG. 6, row 1) while reducing the load in the base stations. In the case of home agent paging, since the paging initiator (home agent) is the bottleneck, the last-location algorithm has an undesirable effect of reducing the paging performance. On the other hand, in foreign agent and domain paging where base station processing is the bottleneck, last-location performs best.

Finally, while the hierarchical algorithm is a generalization of the fixed algorithm, it does not perform as well as the fixed algorithm in terms of paging latency for all three protocols because (1) the hierarchical algorithm could result in multiple paging initiations, the cost of which is much higher than paging processing at the base station, and (2) the impact of unnecessary retries, discussed next. The main motivation to use the hierarchical algorithm is to attempt to reduce the number of page messages over the wireless link.

Figure 9D:
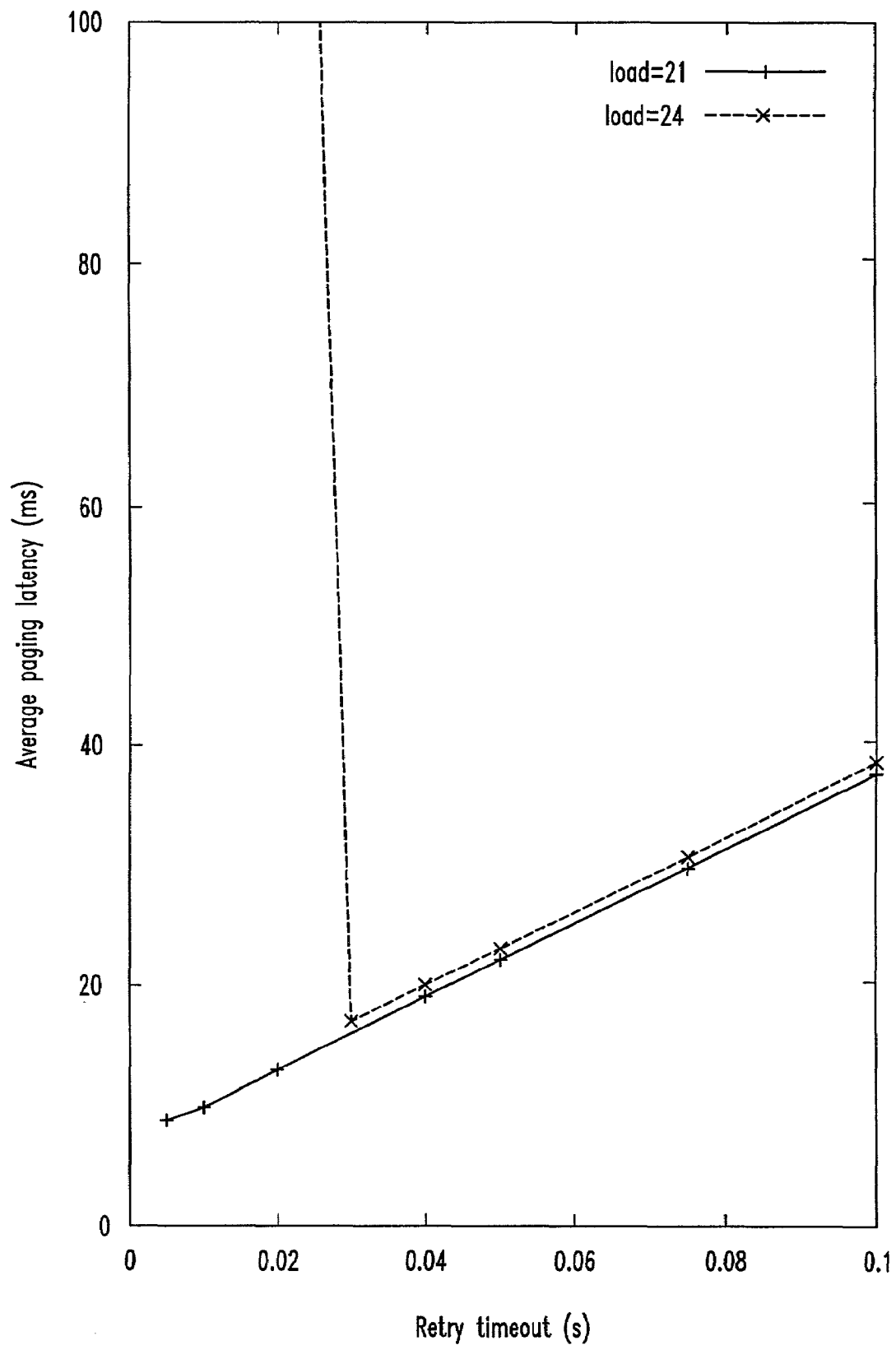

In the last-location and the hierarchical algorithms, a retry timeout interval was used to retry paging at different locations. An unnecessary retry occurs when the paging initiator's retry timeout expires before the host's page response to an initial page request arrives (page response is delayed due to queueing and processing at different nodes). A higher number of unnecessary retries due to a low retry timeout value, results in increasing the paging load and latency. Hence, in FIG. 9(d), as the retry timeout value is increased, the average paging latency decreases up to a certain value (because of reduced number of unnecessary retries). Beyond this value, the average paging latency starts increasing. This is because the cost of locating the host after the retry timeout is now higher due to the larger timeout value. Thus, the hierarchical algorithm should preferably embody a load dependent retry timeout value.

D. Performance Results Summary

Among the three paging protocols, domain paging was found to support the highest paging load at a given paging latency. Foreign agent paging was also able to support a fairly high load in comparison to home agent paging. Home agent paging can still be useful in small networks with low paging load due to its relative simplicity, however.

With respect to the number of updates to the home agent, the domain paging protocol results in the least number of updates with about a 70% reduction compared to the case when paging is not used. Foreign agent paging results in a reduction of about 20%. These results highlight the efficiency of a truly localized paging architecture. It was also found that optimal sizing of the paging area is impacted by a trade-off between update rates and paging processing latencies.

Among the three paging algorithms, it was found that while the last-location algorithm performed best when combined with foreign agent and domain paging, it was the worst performer with home agent paging. This unexpected result for home agent paging may be explained by the fact that last-location exacerbates the source of bottleneck in home agent paging, viz., paging initiation processing.

Reliability

A preliminary unavailability analysis was performed to illustrate the qualitative differences in reliability of the three present paging protocols. "Unavailability" was calculated based on the time the network is unavailable to a mobile user. This results in a conservative estimate since this assumes all users are actively using the network during failures, a likely scenario in peak-hour usage.

The availability analysis was primarily interested in the failure of three components, viz., home agents, foreign agents, and domain routers. In the failure model, it was assumed that failures of these components are independent, and multiple simultaneous failures do not occur. For simplicity, was also assumed that the mean recovery time for each of these components is the same in the three paging protocols, and is denoted $t_{HA}$, $t_{FA}$ and $t_R$ respectively. Let the mean time between failure for each of the components be denoted by $t_M$.

Let N denote the average number of routers in a domain in the path from the home agent to any foreign agent. Let $\alpha$ be the percentage of the users in a domain that move out of the domain coverage while still in session, and $\delta$ be the percentage of users under the coverage of a foreign agent that move out of the foreign agent coverage when in the standby state.

Network unavailability probability U (Availability would simply be 1−U) in the failure model can be defined as $$U = \sum_{i \in component} \frac{\text{Mean recovery time}(i)}{\text{Mean time between failure}(i)}$$

In the case of home agent paging, $$U_{HA} = (t_{HA} + t_{FA} + Nt_R)/t_M,$$

since users are impacted equally when a home agent, foreign agent or router in a path between the user and the home agent or foreign agent, fails.

In the case of foreign agent paging, $$U_{FA} = (t_{HA} + t_{FA} + \delta t_{FA} + Nt_R)/t_M.$$

As compared to home agent paging, the extra term, $\delta t_{FA}$, models the impact of failure of foreign agents that serve as paging initiators for users who move away from the foreign agent and thus, are unreachable.

In the case of domain paging, $$U_{Domain} = (\alpha t_{HA} + t_{FA} + Nt_R)/t_M,$$

since users are affected by their home agent failure only when they move out of the domain while still in session (otherwise, they have no home agents).

For the performance examples herein, we use N=2, $\alpha$=0.1, $t_M$=1 month, and $\delta$=0.5. The sensitivity of U for each of the paging protocols to home agent and to foreign agent recovery times, was plotted (all protocols are equally impacted by the failure of routers in the model).

Figure 10A:
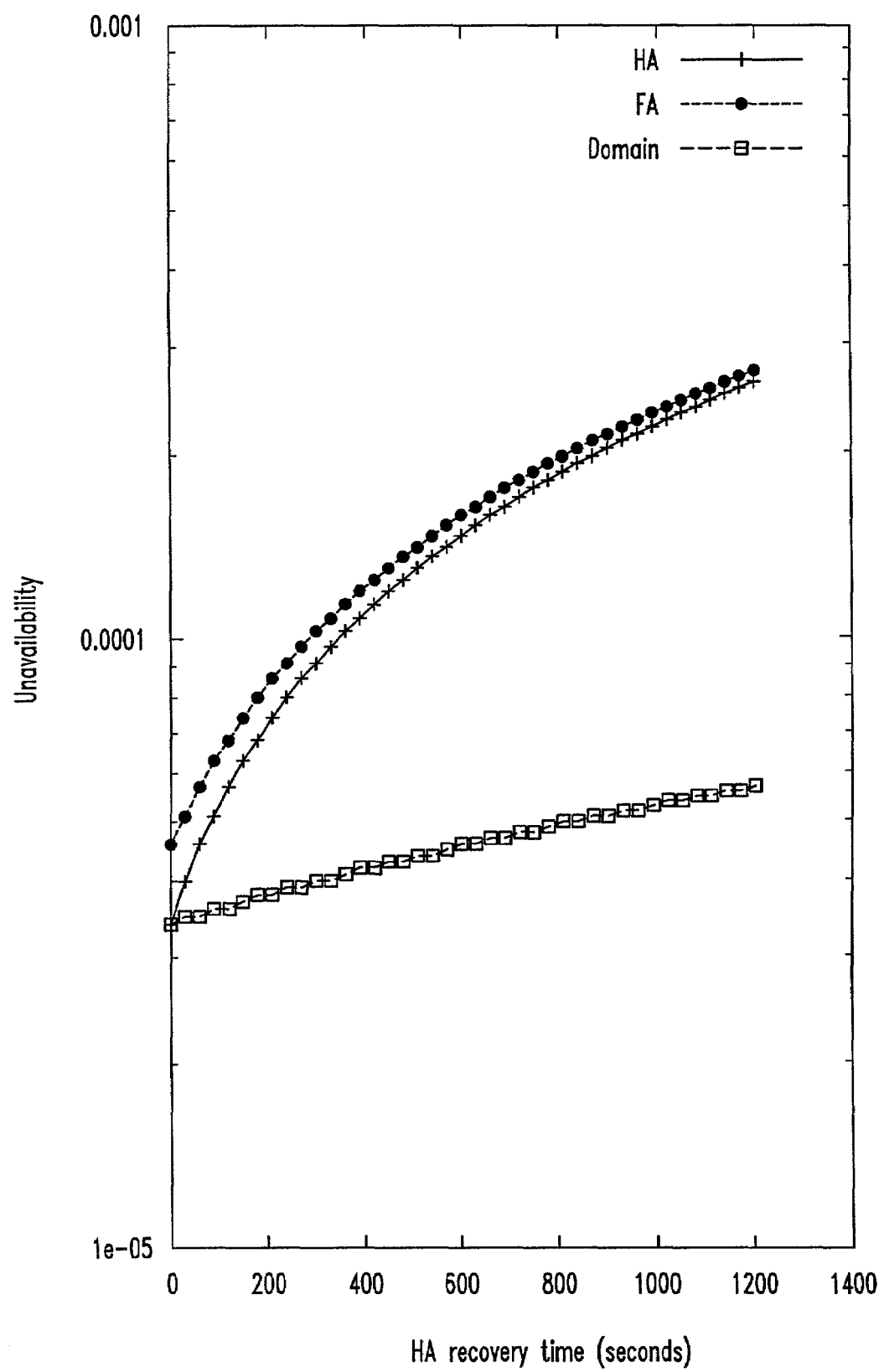
FIGS. 10(a) to 10(b) are plots showing an unavailability probability.

FIG. 10(a) plots the unavailability probability of the three paging protocols in log scale versus home agent recovery time, with $t_R$=30 and $t_{FA}$=120 seconds. Typical unavailability for systems such as a mobile switching center (MSC) ranges between 0.0001 and 0.00001. It is clear that domain paging unavailability is lower than the other two protocols (thus, availability is higher), and this gain can be primarily attributed to the fact that the home agent is only needed for a small subset ($\alpha$) of the users. One way to reduce the unavailability of foreign agent and home agent paging is to improve the reliability of home agents through replication or other means.

Figure 10B:
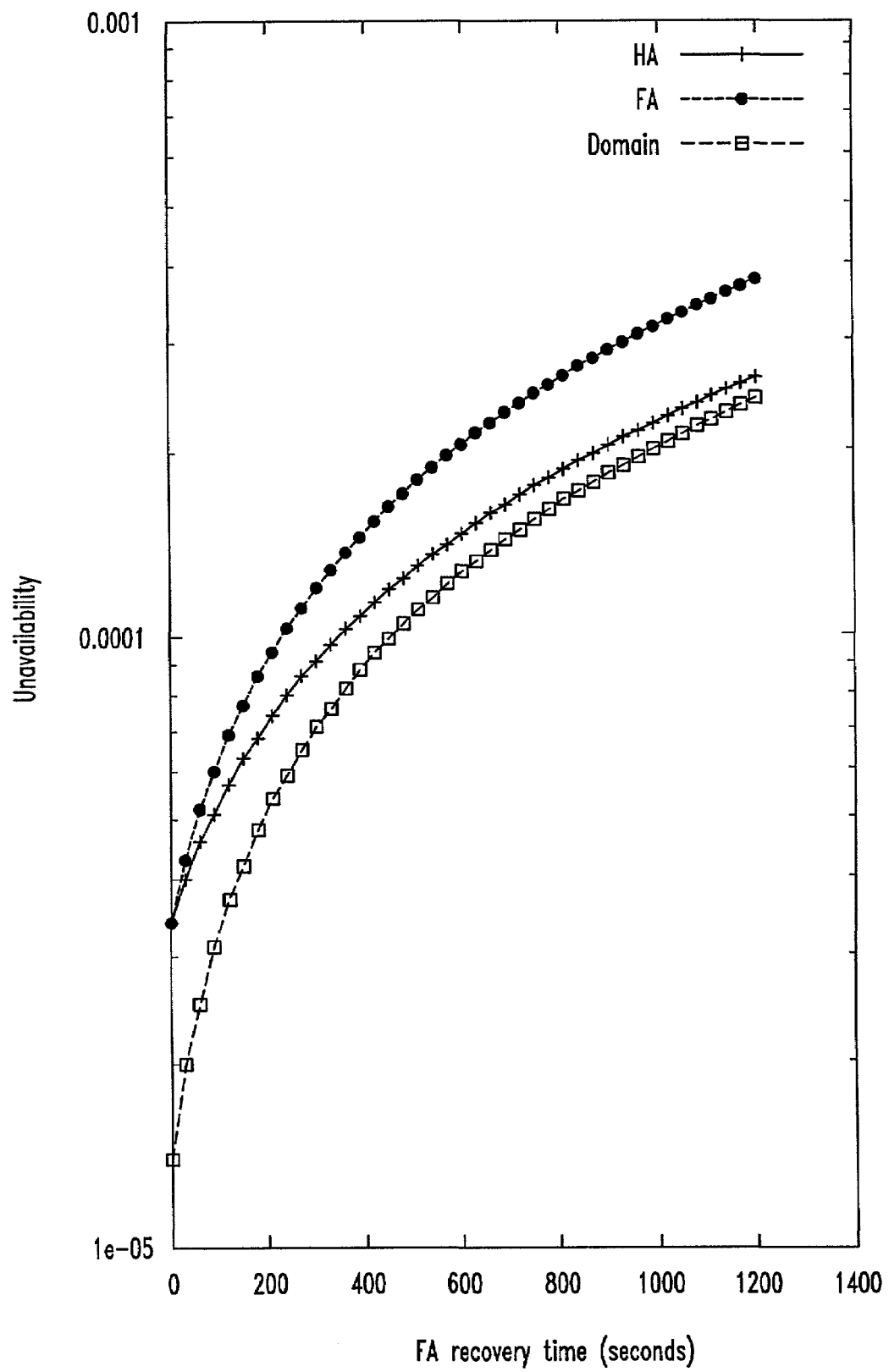

FIG. 10(b) plots unavailability probability of the three paging protocols in log scale versus foreign agent recovery time, with $t_R$=30 and $t_{HA}$=120 seconds. In this case, the difference in unavailability between the protocols is not significant, with the unavailability probability of home agent and domain paging approaching the same value asymptotically, while foreign agent paging performs worst due to the additional impact of foreign agent failure as a failure in paging initiation. While the foregoing analysis illustrates important differences in reliability in the three present paging protocols, it is believed that enhancements may yet be developed to improve the reliability of all three protocols even further.

An important issue to consider with the present paging protocols is the use of IP multicast. For example, multicast may be used to distribute paging request messages to all the base stations a given paging area, wherein a single multicast group address serves as a succinct representation of all IP base stations in the paging area. Furthermore, administratively scoped addresses in foreign agent and domain paging may avoid unnecessary conflicts with other multicast sessions—a potential disadvantage in the use of multicast in home agent paging.

The use of IP multicast may allow for tremendous flexibility. For example, if a new base station is installed due to a cell split, the base station just creates/joins an appropriate multicast group. Base stations may also regroup to form different paging areas, if necessary, by joining corresponding multicast groups. Such changes will be transparent to other routers in the domain; the multicast routing protocol will automatically compute a new multicast tree for each of the paging areas. Implementation of sophisticated paging algorithms such as hierarchical paging is thus simplified, and only requires a configuration of appropriate multicast addresses for the different levels.

The DVMRP multicast routing protocol was embodied in the simulation testbed. This protocol works by a flood and prune mechanism to maintain the multicast tree. Multicast route cache values timed out fairly quickly at each node and resulted in unnecessary flooding within the domain. The use of multicast protocols such as PIM sparse-mode or more recent EXPRESS approach, should help alleviate this problem. Another approach is the use of a vector of unicast IP addresses, when paging areas are relatively small.

Another issue is the amount of buffering needed for incoming packets, while paging of a standby mobile host is being performed. It is believed that for most applications a buffer size of one packet for each mobile host being paged, is sufficient. For example, typical voice-over-IP applications using the Session Initiation Protocol would send a SIP invite packet, and wait for a response before sending more packets. An invoke of a TCP session to the mobile host would result in a TCP SYN packet being sent first. Thus, for these common applications, a buffer size of one packet per paged host would be sufficient, making adequate buffer sizing fairly inexpensive.

It will be appreciated that providing an IP paging service according to the present disclosure will enable a common infrastructure to support different wireless interfaces such as, e.g., CDMA, GPRS, and wireless LAN, thus avoiding duplication of several application layer paging implementations and inter-operability issues that now exist.

EXAMPLE

A detailed example of domain paging according to the invention is now given. Two types of entries, routing and paging, are distinguished in the base stations/routers for forwarding packets to a mobile host. The routing entry allows for regular forwarding of IP packets, while the paging entry enables paging processing. The operation of the router or the base station with respect to these entries is summarized in the Table of FIG. 11.

The processing required to establish paging entries in the base station and routers is explained first. Recall that a mobile host in the standby state updates the network with its current paging area whenever it crosses into a new paging area. In FIG. 12, pseudo-code illustrates the processing of such a paging update message, containing an IP mobile host address, and a multicast group address (MGA) of the paging area. These protocol messages are sent on a well-known UDP port. The code shown in FIG. 12, and other codes presented herein, are executed in each base station/router independently. Observe that the execution of this code results in the processing of the update message from the base station in a hop-by-hop manner up to the domain root router, thus establishing the latest paging area information at these nodes. Thus, this code maintains the following "Update" property:

Update: Up-to-date paging entries are maintained for each mobile host in all the nodes in the path from its last attached base station in the paging area to the domain root router.

The pseudo-code for the main paging processing, including the determination of which node initiates a paging request, is shown in FIG. 13. This maintains the following "Upstream" property:

Upstream: Paging is initiated from routers with paging entry for the mobile host only if packets arrive from the Domain Root Router along the upstream interface.

Maintaining the Upstream property is essential in order to be able to page the mobile host using up-to-date paging area information. This is because stale paging entries created by old paging updates may exist in internal routers for several reasons, including topology or routing changes. In order to avoid paging using stale paging entries for packets originating inside the domain and destined for a mobile host in a standby state, these packets will first be forwarded along the default route to the domain root router. Paging is then initiated only when these packets arrive from the correct upstream node. See line 2 in FIG. 13

Note also that paging is initiated at a router when there is a potential failure due to lack of soft-state refresh messages from a downstream node (line 3), or when the queue size of outstanding page requests is less than an administratively configured value, β (line 4). The latter check is necessary for load balancing when the router is lightly loaded. A simpler alternative where the router determined if it was the paging initiator probabilistically was considered, and found it to have inferior performance. Otherwise, paging is initiated from the user's previous base station by default (line 6). A discussion of how β can be chosen is given later below. For now, observe that β can have any value between zero and infinity (representing always paging from a base station, and always paging from a router). A fractional value for β can also be implemented by using probabilistic techniques.

When the base stations in the paging area receive a paging request packet that was multicast, they send out a link-layer page request message on the air interface. The mobile host sends back a paging response message which is then processed in the base station, and in all the routers between the base station and the paging initiator. This processing is shown in FIG. 14. Observe that the processing of this code at each node from the base station hop-by-hop to the paging initiator helps to maintain the following "downstream" property:

Downstream: Processing of paging response establishes up to date routing entries along the path from the mobile host to the paging initiator.

The correctness of the domain paging protocol can be easily established from the Update, Upstream, and Downstream properties. The Update and the Upstream properties imply that the router/base station initiating the paging has the latest (up to date) paging entry for a given mobile host. The Downstream property guarantees that the routing path from that mobile host to the paging initiator is up to date. Combining the previous two statements, the routing path from the domain root router through the paging initiator to the mobile host is up to date after paging processing is complete, resulting in correct delivery of data packets.

Impact of Varying β on Domain Paging Performance

Figure 15A:
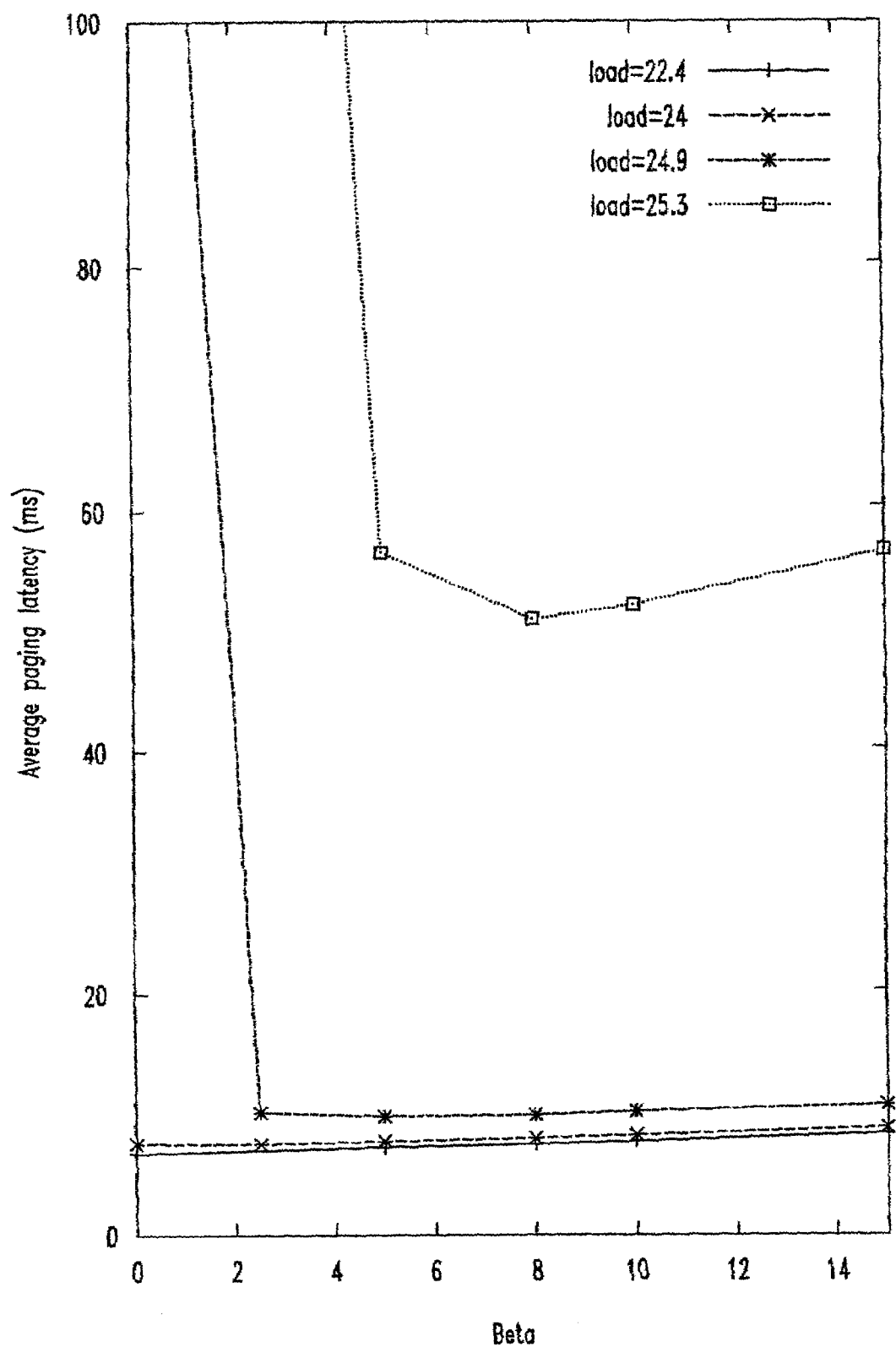
FIGS. 15(a) & 15(b) show the impact of varying a parameter in the paging initiation routine in FIG. 13.

Recall that β (see FIG. 13) represents the threshold for the number of outstanding paging requests at a router below which the router initiates paging. FIG. 15(a) plots average paging latency versus β. There are two important observations.

First, for a given load, as β increases the average paging latency decreases up to a certain value of β, after which the average paging latency starts to increase. The reason for this behavior is that at low values of β, the base station becomes the processing bottleneck, while for high values of β, the router becomes the processing bottleneck. Thus, an optimal value of β exists that minimizes average paging latency by balancing the processing load between the base stations and the router.

Figure 15B:
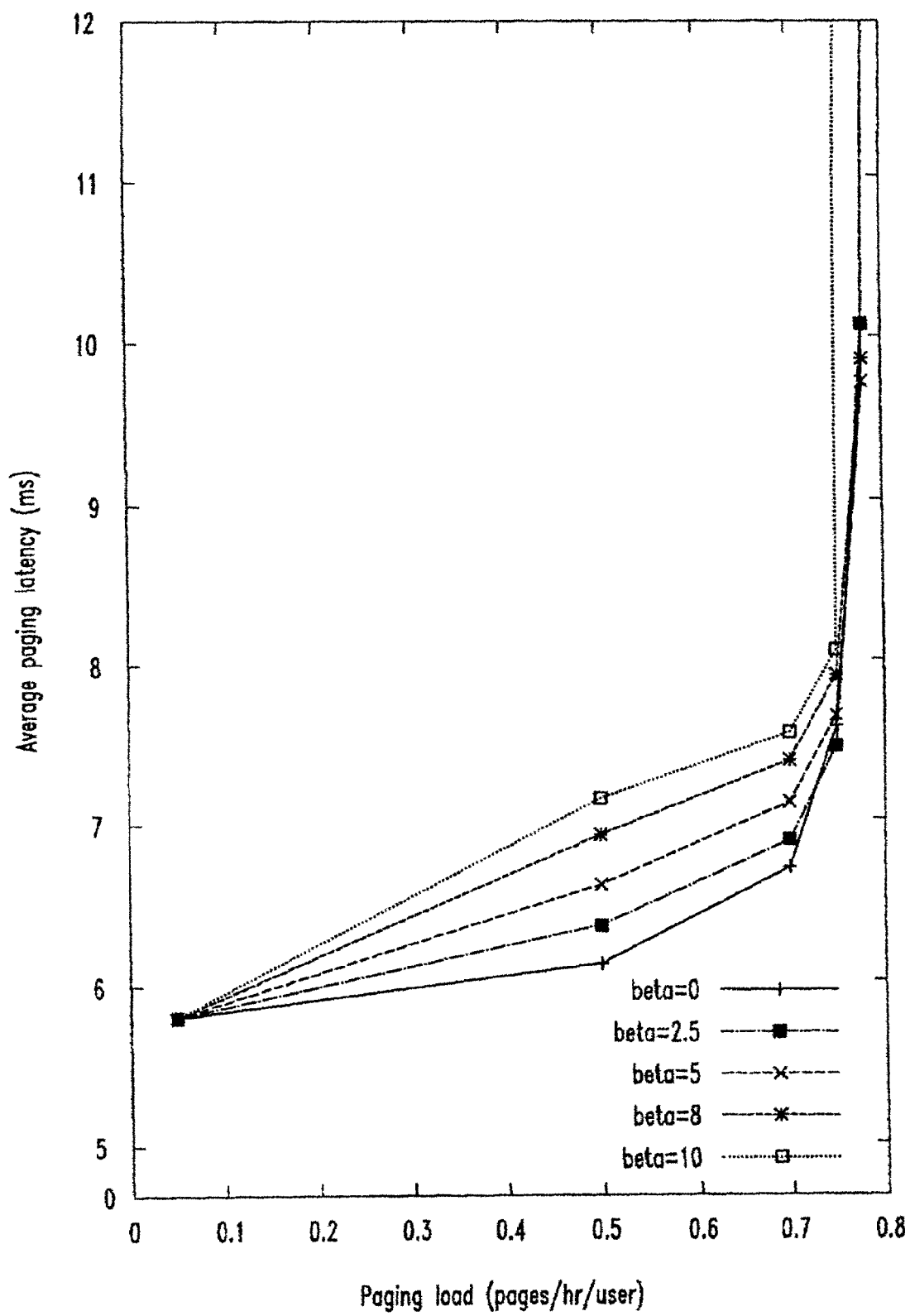

Second, as the load increases, the optimal value of β also increases (note the way the curves shift to the right in FIG. 15(b)). This is because higher values of β imply that the router is taking a higher processing burden. At high paging load, one would expect the router to take a higher processing burden in order to alleviate processing load at the base station. Thus, at high paging load, higher β values lead to better load balancing among the base station and the routers. Note that this behavior has a side-effect: at low load, higher β values result in higher latencies. Thus, domain paging may benefit from an adaptive algorithm for tuning β depending on the paging load. In any event, the penalty for choosing a higher β value is not significantly costly in terms of latency at low load, while the higher β value supports loads greater than those which lower values of β cannot. In the traces examined, performance was satisfactory for a wide range of β having values from 2 to 10.

While the foregoing description represents preferred embodiments of the invention, it will be obvious to those skilled in the art that various modifications made be made without departing from the spirit and scope of the invention pointed out by the following claims.

We claim:

1. A method of operating a mobile host for linking with an Internet protocol (IP) network, comprising:
    configuring the mobile host for assuming a selected one of an active state and a standby state;
    informing certain nodes of the network of a change of the host's point of attachment with the network from one base station to another base station when the host is in the active state, wherein the network has paging areas each of which includes one or more base stations;
    informing the nodes only when a new point of attachment with the network is a base station of a paging area different from a paging area of a last point of attachment with the network, when the host is in the standby state;
    responding to a page request received from one or more base stations within a current paging area of the host when in the standby state, said request originating at a home agent or a base station acting as a tunneled foreign agent, by transmitting a page response for reception by one of the base stations and transitioning to the active state;
    developing routing information concerning the mobile host based on the response; and
    receiving data from one of the base stations that was addressed to the mobile host while the host was in the standby state based on the developed routing information.

2. The method of claim 1, including conserving battery power at the mobile host when the host is in the standby state.

3. The method of claim 1, including transitioning from the active state to the standby state after a determined time out interval in the absence of data exchanged between the mobile host and the network.

4. A method of paging mobile hosts over an Internet protocol (IP) network comprising:
    coupling base stations to the IP network wherein one or more base stations define associated paging areas;
    initiating a page request for a mobile host at a given node of the network when the data on the network is addressed to the host;
    receiving the data addressed to the mobile host at a home agent on the network;
    defining a domain root router along a path on the network between the home agent and a current paging area for the mobile host;
    sending update messages to the domain root router from the mobile host: (i) when the host detaches from one base station and re-attaches to another base station while the host is in an active state; and (ii) only when the host re-attaches to a base station outside the current paging area while the host is in a standby state, thereby developing routing information concerning the mobile host at each node in a path between a last-serving base station for the mobile host and the domain root router;
    receiving a page response from the mobile host; and
    delivering the data to the mobile host according to the routing information.

5. The method as in claim 4 comprising: configuring the mobile host to respond to the page request when in the standby state by transmitting a page response for reception by a base station in the paging area.

6. The method of claim 4, including periodically advertising the identity of the domain root router in all paging areas of an associated domain.

7. The method of claim 4, including initiating the page request from a page initiator comprising a router or a base station along a path between the domain root router and the last-serving base station in the paging area for the mobile host.

8. The method of claim 7, including buffering data addressed to the mobile host at the page initiator when the host is in the standby state.

9. The method of claim 7, including sending the page response from the mobile host to the page initiator thereby updating the routing information concerning the mobile host.

10. The method of claim 9, including delivering the data buffered at the page initiator to the mobile host when the host transitions to the active state, according to the updated routing information.

11. The method of claim 7, including directing the page request from the page initiator to the base stations according to a selected one of a fixed paging algorithm, a hierarchical paging algorithm, or a last-location paging algorithm.

12. A method of paging mobile hosts over an Internet protocol (IP) network comprising:
    coupling base stations to the IP network wherein one or more base stations define associated paging areas;
    receiving data addressed to a mobile host at a home agent on the network;
    initiating a page request from the home agent;

directing the page request from the home agent to at least one of the base stations in a current paging area of the mobile host;

receiving a page response from the mobile host at a base station in the current paging area;

developing routing information concerning the mobile host based on the response; and delivering the data addressed to the mobile host based on the developed routing information.

13. The method of claim 12, including directing information to the home agent concerning a current location of the mobile host from a base station that receives the page response from the mobile host.

14. The method of claim 12, including buffering the data addressed to the mobile host at the home agent when the host is in a standby state.

15. The method of claim 14, including delivering the data buffered at the home agent to the mobile host when the host transitions to an active state.

16. The method of claim 15, including delivering data later received at the home agent and destined to the mobile host, to the mobile host while the host is in the active state.

17. The method of claim 12, including directing the page request from the home agent to the base stations according to a selected one of a fixed paging algorithm, a hierarchical paging algorithm, or a last-location paging algorithm.

18. A method of paging mobile hosts over an Internet protocol (IP) network comprising:

coupling base stations to the IP network wherein one or more base stations define associated paging areas;

receiving data addressed to a mobile host at a home agent on the network;

tunneling the data from the home agent to a designated foreign agent on the network;

receiving a page response from the mobile host at a base station in the current paging area of the host;

developing routing information concerning the mobile host based on the response; and delivering the data addressed to the mobile host based on the developed routing information.

19. The method of claim 18, including designating a last serving base station in the paging area for the mobile host as a last foreign agent, and buffering the tunneled data from the home agent at the last foreign agent.

20. The method of claim 19, including initiating the page request from the last foreign agent, and directing the page request to at least one of the base stations in the paging area of the host.

21. The method of claim 20, including transmitting to the home agent a current location of the mobile host from a base station that receives the page response from the host, and designating the base station that receives the page response as a current foreign agent.

22. The method of claim 21, including delivering the data buffered at the last foreign agent to the mobile host through the current foreign agent, when the mobile host transitions to an active state.

23. The method of claim 20, including directing the page request from the last foreign agent to the base stations according to a selected one of a fixed paging algorithm, a hierarchical paging algorithm, or a last-location paging algorithm.

* * * * *